US009662745B2

(12) United States Patent
Yao et al.

(10) Patent No.: US 9,662,745 B2
(45) Date of Patent: May 30, 2017

(54) METHODS, DEVICES, SYSTEMS FOR JOINING MATERIALS AND RESULTING ARTICLES

(75) Inventors: Y. Lawrence Yao, North Caldwell, NJ (US); Gen Satoh, Pittsburgh, PA (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 741 days.

(21) Appl. No.: 14/003,319

(22) PCT Filed: Mar. 11, 2012

(86) PCT No.: PCT/US2012/028675
§ 371 (c)(1),
(2), (4) Date: Sep. 16, 2013

(87) PCT Pub. No.: WO2012/125515
PCT Pub. Date: Sep. 20, 2012

(65) Prior Publication Data
US 2014/0008335 A1    Jan. 9, 2014

Related U.S. Application Data

(60) Provisional application No. 61/452,037, filed on Mar. 11, 2011.

(51) Int. Cl.
*B23K 26/323* (2014.01)
*B23K 1/19* (2006.01)
(Continued)

(52) U.S. Cl.
CPC ........ *B23K 26/3233* (2013.01); *B23K 1/0008* (2013.01); *B23K 1/0056* (2013.01);
(Continued)

(58) Field of Classification Search
CPC ...... B23K 1/0008; B23K 1/0056; B23K 1/19; B23K 26/0622; B23K 26/0732; B23K 26/0626; B23K 26/26; B23K 26/323
See application file for complete search history.

(56) References Cited

U.S. PATENT DOCUMENTS 4,281,235 A    7/1981 Peloquin
4,714,815 A *  12/1987 Swarts ................. B23K 1/0056
                                            219/121.63
(Continued)

FOREIGN PATENT DOCUMENTS

DE          1182510 B       11/1964
JP        58-090389 A   *    5/1983
(Continued)

OTHER PUBLICATIONS

Machine translation of Japan Patent document No. 2001-252,577, May 2016.*
(Continued)

*Primary Examiner* — Geoffrey S Evans
(74) *Attorney, Agent, or Firm* — Potomac Law Group, PLLC; Mark Catan

(57) ABSTRACT

A method, article of manufacture, and system for joining different materials is described. In a principal embodiment, two articles, for example different metals, are placed in proximity to one another with an interfacial area. One article is heated using a laser that is scanned across from a point remote from the interface to a point at or just short of the interface. In embodiments, the interfacial bond region is characterized by a homogenous mixed phase region with very low to substantially no brittle intermetallics.

21 Claims, 15 Drawing Sheets

(51) Int. Cl.
| | | |
|---|---|---|
| B23K 26/32 | (2014.01) | |
| B23K 1/00 | (2006.01) | |
| B23K 1/005 | (2006.01) | |
| B23K 26/073 | (2006.01) | |
| B23K 26/26 | (2014.01) | |
| B23K 26/0622 | (2014.01) | |
| B23K 101/18 | (2006.01) | |
| B23K 101/32 | (2006.01) | |
| B23K 103/24 | (2006.01) | |

(52) U.S. Cl.
CPC ............ *B23K 1/19* (2013.01); *B23K 26/0622* (2015.10); *B23K 26/0732* (2013.01); *B23K 26/26* (2013.01); *B23K 26/323* (2015.10); *B23K 2201/185* (2013.01); *B23K 2201/32* (2013.01); *B23K 2203/24* (2013.01)

(56) References Cited

U.S. PATENT DOCUMENTS

| | | | | |
|---|---|---|---|---|
| 5,828,032 | A | * | 10/1998 | Krzys .................. B23K 15/006 219/121.64 |
| 6,000,601 | A | | 12/1999 | Walak |
| 6,053,209 | A | * | 4/2000 | Wagner .................. B21C 37/26 138/142 |
| 6,554,854 | B1 | | 4/2003 | Flanagan |
| 7,312,417 | B2 | | 12/2007 | Becker et al. |
| 7,850,059 | B2 | | 12/2010 | Kobayashi et al. |
| 9,452,490 | B2 | * | 9/2016 | Dudziak ............ B23K 15/0093 |
| 2004/0182835 | A1 | | 9/2004 | Hall |
| 2008/0277385 | A1 | | 11/2008 | Thanigachalam et al. |
| 2009/0130482 | A1 | * | 5/2009 | Kocik ................ B23K 15/0006 428/651 |
| 2014/0144890 | A1 | * | 5/2014 | Dudziak ............ B23K 15/0093 219/121.14 |

FOREIGN PATENT DOCUMENTS

| | | | |
|---|---|---|---|
| JP | 59-030489 | | 2/1984 |
| JP | 06-251675 | | 9/1994 |
| JP | 2001-252777 | A * | 9/2001 |
| JP | 2004-178872 | A | 6/2004 |
| JP | 2006-088175 | A * | 4/2006 |
| JP | 2006-281279 | A * | 10/2006 |

OTHER PUBLICATIONS

Wagner et al., "Characterization and Properties of Dissimilar Metal Combinations of Fe/Al and Ti/Al—Sheet Materials," Jul. 24, 2001 [online], [retrieved on Jun. 4, 2012]. Retrieved from the Internet: <URL: http://www.bias.de/Abteilungen/SOT/Publikationen/Buecher/Characterization.pdf>.

Extended European Search Report, dated May 6, 2015, for European Application No. 12758148.6.

Birnbaum et al., "The Effects of Laser Forming on NiTi Superelastic Shape Memory Alloys," *Journal of Manufacturing Science and Engineering*, Aug. 2010, vol. 132, pp. 041002-1 to 8.

Chen et al., "Numerical modeling and experimental investigation of diffusion brazing SS304/BNi-2/SS304 joint," *Science and Technology of Welding & Joining*, Jan. 2009, vol. 14 (1), pp. 32-41.

Duarte et al., "Experimental study of the Fe—Ni—Ti system," *Intermetallics*, Mar. 2010, vol. 18(3), pp. 374-384.

Elmer et al., "In-Situ Phase Mapping and Direct Observations of Phase Transformations during Arc Welding of 1045 Steel," *Metallurgical and Materials Transactions A*, Jul. 2006, vol. 37A, pp. 2171-2182.

Elmer et al., "Phase transformation dynamics during welding of Ti—6Al—4V," *Journal of Applied Physics*, Jun. 15, 2004, vol. 95 (12), pp. 8327-8339.

Ghosh et al., "Characterization of transition joints of commercially pure titanium to 304 stainless steel," *Materials Characterization*, Jul. 2002, vol. 48(5), pp. 393-399.

Ghosh et al., "Effect of interface microstructure on the bond strength of the diffusion welded joints between titanium and stainless steel," *Materials Characterization*, May 2005, vol. 54(4-5), pp. 327-337.

He et al., "Mechanism of forming interfacial intermetallic compounds at interface for solid state diffusion bonding of dissimilar materials," *Materials Science and Engineering A*, Nov. 2006, vol. 437(2), pp. 430-435.

Hilfiker et al., "In vitro image characteristics of an abdominal aortic stent graft: CTA versus 3D MRA," *Magma*, Mar. 1999, vol. 8(1), pp. 27-32.

Illingworth et al., "Numerical modeling of transient liquid phase bonding and other diffusion controlled phase changes," *Journal of Materials Science*, May 2005, vol. 40(9-10), pp. 2505-2511.

Kundu et al., "Characterization of diffusion bonded joint between titanium and 304 stainless steel using a Ni interlayer," *Materials Characterization*, May 2008, vol. 59(5), pp. 631-637.

Kundu et al., "Diffusion bonding of commercially pure titanium to 304 stainless steel using copper interlayer," *Materials Science and Engineering A*, Oct. 2005, vol. 407(1-2), pp. 154-160.

Louzguine et al., "High-strength binary Ti—Fe bulk alloys with enhanced ductility," *Journal of Materials Research*, Dec. 2004, vol. 19(12), pp. 3600-3606.

Mian et al., "Laser bonded microjoints between titanium and polyimide for applications in medical implants," *Journal of Materials Science, Materials in Medicine*, Mar. 2005, vol. 16(3), pp. 229-237.

Ray et al., "The Constitution of Metastable Titanium-Rich Ti—Fe Alloys: An Order-Disorder Transition," *Metallurgical Transactions*, Mar. 1972, vol. 3, pp. 362-629.

Ryhänen et al., "Biocompatibility of nickel-titanium shape memory metal and its corrosion behavior in human cell cultures," *Journal of biomedical materials research*, Jul. 1997, vol. 35(4), pp. 451-457.

Satoh et al., "Annealing Effect on the Shape Memory Properties of Amorphous NiTi Thin Films," *Journal of Manufacturing Science and Engineering*, Oct. 2010, vol. 132, pp. 051004-1-051004-9.

Satoh et al., "Characterization and Prediction of Texture in Laser Annealed NiTi Shape Memory Thin Films," *Journal of Manufacturing Science and Engineering*, Oct. 2012, vol. 134, pp. 051006-1-051006-11.

Satoh et al., "Strength and microstructure of laser fusion-welded Ti—SS dissimilar material pair," *The International Journal of Advanced Manufacturing Technology*, Apr. 2013, vol. 66, pp. 469-479.

Small et al., "Prototype Fabrication and Preliminary In Vitro Testing of a Shape Memory Endovascular Thrombectomy Device," *IEEE Transactions on Bio-Medical Engineering*, Sep. 2007, vol. 54(9), pp. 1657-1666.

Stoeckel et al., "Self-Expanding Nitinol Stents—Material and Design Considerations," *European Radiology*, Mar. 2003, vol. 14(2), pp. 292-301.

Tsujino et al., "Welding Characteristics of Aluminum, Copper, Nickel and Aluminum Alloy with Alumina Coating Using Ultrasonic Complex Vibration Welding Equipments," *IEEE International Ultrasonics Symposium Proceedings*, Sep. 2009, pp. 1211-1214.

Vaidya et al., "Structure-property investigations on a laser beam welded dissimilar joint of aluminum AA6056 and titanium Ti6Al4V for aeronautical applications Part I: Local gradients in microstructure, hardness and strength," *Materialwissenschaft und Werkstofftechnik*, Aug. 2009, vol. 40(8), pp. 623-633.

Yao et al., "Interface microstructure and mechanical properties of laser welding copper-steel dissimilar joint," *Optics and Lasers in Engineering*, Jul. 2009, vol. 47(7-8), pp. 807-814.

International Search Report and Written Opinion for International Application No. PCT/US12/28675 dated Jul. 13, 2012.

ASTM, "Standard Test Method for Conducting Cyclic Potentiodynamic Polarization Measurements to Determine the Corrosion Susceptibility of Small Implant Device," ASTM International, 2008. Copyright Sep. 20, 2013.

(56) References Cited

OTHER PUBLICATIONS

Bauer et al., "Laser micro-joining of dissimilar and biocompatible materials," Proceedings of SPIE, 2004, vol. 5339, pp. 454-464 dated Jul. 15, 2004.

Birnbaum et al., "Functionally grading the shape memory response in NiTi films: Laser irradiation," Journal of Applied Physics, 2009, vol. 106(4), pp. 043504-1 received Feb. 25, 2009.

Birnbaum et al., "On the lateral crystal growth of laser irradiated NiTi thin films," Applied Physics Letters, 2009, vol. 94, pp. 261908-1-261908-3 received Jan. 5, 2009.

Birnbaum et al., "Substrate temperature effects on laser crystallized NiTi thin films," Journal of Applied Physics, 2009, vol. 105(7), pp. 073502-1-073502-10 received Sep. 26, 2008.

Borrisutthekul et al., "Dissimilar material laser welding between magnesium alloy AZ31B and aluminum alloy A5052-O," Science and Technology of Advanced Materials, 2005, pp. 199-204 received Sep. 15, 2004.

Borrisutthekul et al., "Suppression of intermetallic reaction layer formation by controlling heat flow in dissimilar joining of steel and aluminum alloy," Materials Science and Engineering A, 2007, vol. 467, pp. 108-113 received Oct. 27, 2006.

Chen et al., "Laser Penetration Brazing of Brass and Low Carbon Steel," Proceedings of ICALEO, 2007, pp. 577-581 dated Oct. 2001.

Eckelmeyer, K.H., "The effect of alloying on the shape memory phenomenon in nitinol," Scripta Metallurgica, vol. 10, pp. 667-672 received Nov. 19, 1975.

Kraft et al., "An extended numerical procedure for predicting microstructure and microsegregation of multicomponent alloys," Modeling and Simulation in Materials Science and Engineering, 1996, vol. 4(2), pp. 161-177 received Aug. 23, 1995.

Lee et al., "Interlayer engineering for dissimilar bonding of titanium to stainless steel," Materials Letters, 2010, vol. 64 (9), pp. 1105-1108 received Jan. 22, 2010.

Li et al., "Corrosion behavior of the laser-brazed joint of TiNi shape memory alloy and stainless steel in artificial saliva," Materials Science and Engineering A, 2006, vol. 441, pp. 271-277 received Sep. 26, 2005.

Li et al., "Effects of silver based filler metals on microstructure and properties of laser brazed joints between TiNi shape memory alloy and stainless steel," Science and Technology of Welding and Joining, 2007, vol. 12(2), pp. 183-189 received Aug. 17, 2006.

Miao et al., "Effect of laser offsets on joint performance of laser penetration brazing for magnesium alloy and steel," Materials and Design, 2010, vol. 31(6), pp. 3121-3126 Oct. 6, 2009.

Mys et al., "Laser Micro Welding of Copper and Aluminum," Proceedings of SPIE, 2006, vol. 6107, pp. 610703-1-610703-6 received Feb. 23, 2006.

Ozaki et al., "Laser roll welding of dissimilar metal joint of zinc coated steel to aluminum alloy," Journal of Laser Applications, 2010, vol. 22(1), pp. 1-6 received Oct. 12, 2001.

Roósz et al., "Ternary Restricted-Equilibrium Phase Diagrams-I. A First Report: General Principles and Definitions," Acta Metallurgica et Materialia, 1990, vol. 38(10), pp. 2003-2008 received Dec. 23, 1989.

Roósz et al., "Ternary Restricted-Equilibrium Phase Diagrams-II Practical Application: Aluminium-Rich Corner of the Al—Cu—Mg System," Acta Metallurgica et Materialia, 1990, vol. 38(10), pp. 2009-2016 received Dec. 23, 1989.

Safarevich et al., "Fiber Laser Welding of High Integrity Implantable Medical Devices," ICALEO 2007 Congress Proceedings, pp. 395-401 dated Dec. 2006.

Siekmeyer et al., "Novel Micro-Joining Techniques to Improve Stent Radiopacity. A Comparison of Welding and Riveting Processes," Proceedings of the Materials & Processing for Medical Devices Conference, 2006, pp. 57-62 Nov. 2005.

Wiskirchen et al., "Radiopacity of Current Endovascular Stents: Evaluation in a Multiple Reader Phantom Study," Journal of Vascular and Interventional Radiology, 2004, vol. 15(8), pp. 843-852 Aug. 2004.

\* cited by examiner

METHODS, DEVICES, SYSTEMS FOR JOINING MATERIALS AND RESULTING ARTICLES

CROSS REFERENCE TO RELATED APPLICATIONS

This application is a national stage entry of International Application No. PCT/US12/28675, filed 11 Mar. 2012, which claims the benefit of U.S. Provisional Appln. No. 61/452,037, filed 11 Mar. 2011, both of which are hereby incorporated by reference as if fully set forth herein.

STATEMENT REGARDING FEDERALLY SPONSORED RESEARCH

This invention was made with government support under 1130564 awarded by the National Institutes of Health. The government has certain rights in the invention.

BACKGROUND

Joining of dissimilar biocompatible metals is attractive for a variety of reasons such as the introduction of novel functionalities through the incorporation of shape memory or superelastic materials or for the selective use of exceptionally inert materials such as Pt for critical and long-term implant applications. One reason there is interest in joining dissimilar biocompatible metals for medical devices is due to unique properties and functionalities possessed by materials such as NiTi (shape memory and superelastic properties), Pt (inertness, electrical conductivity), and stainless steel (biocompatibility, low cost). The need to join these materials stems from the desire to integrate their unique properties in a robust and cost-effective manner.

Traditional joining processes have limited spatial selectivity and large heat inputs (arc welding, etc) which promote brittle phase formation. Brazing using a filler material with a lower melting temperature than either of the base materials can eliminate melting of the base metals and can potentially avoid intermetallic formation but requires careful selection of the filler material. This may be particularly difficult in medical devices due to the required biocompatibility. For example, laser brazing of NiTi shape memory alloys to stainless steel using silver-based filler materials can cause corrosion resistance of the joint to be worse than that of the base materials.

Solid-state processes can also be performed which may allow for greater control over material mixing. One such process, diffusion bonding for direct bonding of biocompatible material pairs such as NiTi/SS, results in the formation of brittle intermetallics. Diffusion bonding of the same material pair using Ni and Cu interlayers also observed the formation of intermetallics at the joint interfaces. In addition, this bonding process can require heating of the entire device to elevated temperatures and, like ultrasonic welding, the ability to impart a compressive stress on the joint. These requirements can make such process difficult for medical devices with heat-sensitive components, small size, and complex joint geometries.

Traditional joining methods including mechanical joints, such as riveting and crimping may have problems with sterilization, hermetic sealing, and crevice corrosion, for instance. Diffusion bonding may require significant processing time, unnecessary heating of potentially heat-sensitive components, and like ultrasonic welding, may be impossible to perform on some joint geometries due to the need for mechanical loading of the joint. Traditional brazing joints require the addition of filler materials which can increase process complexity and cost with the added issue of potentially non-biocompatible filler materials. Adhesives have been used for use in medical devices but may not be acceptable for long-term implantation applications. Fusion welding processes can result in excessive heat input and mixing of the base materials which can promote brittle intermetallic phase formation in dissimilar metal pairs.

BRIEF DESCRIPTION OF THE DRAWINGS

The accompanying drawings illustrate embodiments of the disclosed subject matter. The disclosed subject matter will be best understood by reading the ensuing specification in conjunction with the drawing figures, in which like elements are designated by like reference numerals, and wherein.

DESCRIPTION

Figure 1A:
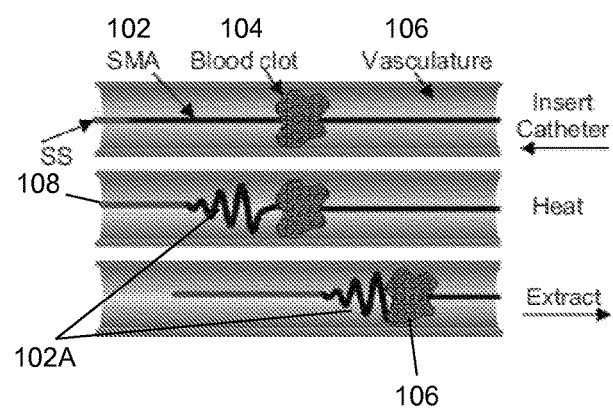
FIG. 1A shows a shape memory alloy (SMA) based endovascular thrombectomy device joining the SMA (for heat-triggered actuation) with stainless steel (SS).

The joining of dissimilar metals is a critical process for the future development and evolution of medical devices which would enable the selective use of the unique properties exhibited by biocompatible materials such as stainless steel and titanium, as well as shape memory materials such as NiTi to locally tailor the properties of implantable medical devices. Many joints between dissimilar metals, however, suffer from significant intermetallic formation which causes them to fail in a brittle manner. This study investigates a novel process, laser autogenous brazing, being developed by the authors that enables joining of dissimilar metal pairs through a braze-like interface without the use of filler materials to maintain biocompatibility while forming a robust mechanical joint. The formation of brittle intermetallics is mitigated by controlling the thermal profile in the irradiated material through the use of thermal accumulation to limit melting to the joint interface. The strength, composition, microstructure, and fracture surface morphologies of the resultant joints are investigated as a function of processing parameters and thermal simulations are used to aid in understanding the joint formation mechanism.

One impediment may be the formation of brittle intermetallic phases within the joints. Dissimilar metal joints, however, are often complicated by the formation of new phases such as brittle intermetallics within the joint that lead to low strength and premature failure. A number of metals have been identified as proven or potential biocompatible materials. These include particular Ti, Co, Au, Ag, Pd, and Pt-based alloys and specific grades of stainless steel (SS) among others. Each of these materials has respective properties for device performance.

Ti and stainless steel can enable physically robust bulk implants and devices with relatively good biocompatibilities at relatively low cost and are often used for prosthetics and for hermetically sealed pacemaker cases (Ti). Pt can be used for its radiopacity (marker bands or guidewires) in catheters for visibility in x-ray images and for electrodes in pacemakers and Implantable Cardioverter Difibrillators (ICD) due to its inert nature and relatively high electrical conductivity. Smart materials such as shape memory alloys (SMAs) make possible novel device functionalities through thermally-driven actuation and superelastic deformation. The shape memory and superelastic effects of SMAs have been used in medical devices for steerable catheters and stents but are generally limited to monolithic components and suffer from limited radiopacity. Joining different pairs of these materials can have many potential benefits such as reduced material cost (selective use of Pt) and the incorporation of unique device functionalities (shape memory materials).

The joining of dissimilar biocompatible materials can introduce unique functionalities through the use of shape memory alloys such as NiTi in conjunction with stainless steel (SS), including, for example, decreasing costs while maintaining exceptional corrosion resistance in Pt-to-SS joints. To address these requirements, a new laser joining process is investigated to form autogenous (no filler material) joints between dissimilar, biocompatible metal pairs. The autogenous laser joining process enables seamless joining of these components and eliminates the need for adhesives and filler materials.

Applications for the joining of different metals include the closing of implantable housing such as the cases of pacemakers and defibrillators, fabrication of catheters including steerable catheters, joining of radiopaque markers to catheters or other medical devices, and many others.

Figure 4A:
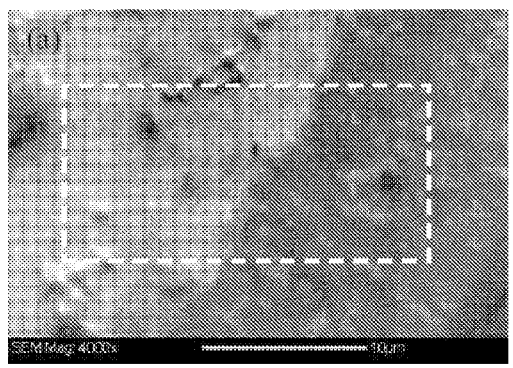
FIG. 4A shows a SEM image of joint interface between stainless steel and titanium formed at a low cooling rate. Dashed box indicates area scanned by EBSD.
Figure 4B:
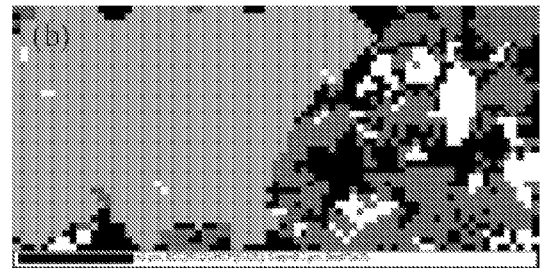
FIG. 4B shows an EBSD map of region outlined in FIG. 4A showing the existence of clearly delineated HCP (Green) and BCC (Red) regions.

An impediment to the direct joining of dissimilar metals is the formation of intermetallic phases. These phases exist typically within a limited homogeneity range. Due to their highly-ordered and complex structures, many intermetallics have long Burgers vectors which limits plastic deformation and renders them extremely brittle. The limited homogeneity range also results in the formation of two-phase microstructures such as dendrites or eutectics unless the composition is within a specific range. A SEM image typical of a two phase microstructure observed in a SS-Ti fusion weld with low cooling rate is shown in FIG. 4a. Dendritic microstructures (FIG. 4b) are typical of processes with moderate cooling rates. These complex microstructures require spatially resolved characterization methods such as energy-dispersive x-ray spectroscopy (EDX) for compositional analysis which is combined with electron backscatter diffraction (EBSD) in the crystal structure analysis shown in FIG. 5. EBSD aids in the accurate identification of phases where multiple may exist due to metastable phase formation or other kinetic effects.

Presently, we disclose a process for autogenous laser brazing and demonstrate that it can be used to join two biocompatible materials, stainless steel 316L and NiTi. The joint geometries were analyzed through optical and scanning electron microscopy (SEM) of sample cross-sections while compositional analysis is performed using energy-dispersive x-ray spectroscopy (EDS). Joint strength is determined though tensile testing to fracture and fracture surface morphology is observed using SEM.

Embodiments of the disclosed subject matter involve systems, methods, and devices for joining dissimilar metals without filler material or materials, adhesives, or mechanical fasteners. Embodiments of the disclosed subject matter also can join materials with similar or dissimilar melt temperatures without a filler material or materials, adhesives, or mechanical fasteners. More specifically, embodiments of the disclosed subject matter involve a joining process, autogenous (no filler material) laser brazing, for joining dissimilar biocompatible metals. Such joining of dissimilar biocompatible metals may be used in micro-scale medical device applications.

Such joining may be used in medical device (e.g., for stents, pacemakers, etc.), automotive, and aerospace applications, for instance. The elimination of filler materials in the joints can allow for the biocompatibility of the base materials to be maintained after joining. Thus, in the case of medical device applications, filler-free joints according to embodiments of the disclosed subject matter can be used where there is a need to maintain biocompatibility.

Further, joining of dissimilar metal pairs according to embodiments of the disclosed subject matter can mitigate or eliminate the formation of deleterious phases such as brittle intermetallics. The mitigation or elimination of intermetallics in dissimilar metal joints can provide for more robust mechanical properties in the joint.

Embodiments of the disclosed subject matter can enable joining of two dissimilar materials without mixing in the liquid phase by restricting melting to only one material.

In various embodiments, an autogenous laser brazing process can be implemented. Such brazing process can minimize mixing of the dissimilar materials as well as increase the cooling rate experienced by the molten material to inhibit intermetallic phase formation while eliminating the need for filler materials.

Embodiments of the disclosed subject matter are directed to an autogenous laser brazing process (and system and device thereof) that can limit mixing of the materials and can rapidly cool the molten metal without the use of filler material or filler materials.

Implementation of embodiments of the disclosed subject matter also involves different joint geometries and material pairs, which may require spatially resolved simulation capabilities for prediction of joint microstructure and phase formation in multi-component systems at finite cooling rates, for example. Implementation also may include simulation and/or experimental analysis.

Laser-based joining processes permit low thermal input and small heating areas. The advantages of lasers in joining processes over conventional heat sources, such as minimal heat-affected zones and controlled energy delivery, are vital to medical device manufacturing processes due to the thermal sensitivity of components as well as their continued miniaturization. These same characteristics are crucial in forming reliable joints between dissimilar materials. The tightly controlled heat input allows precise, selective processing and strict control over the melting and intermixing of the two materials.

Disclosed embodiments include the joining of two material pairs, for example, stainless steel-NiTi and Pt-NiTi, in two different joint geometries, wire-wire and sheet-sheet butt joints, for instance.

Embodiments of the disclosed subject matter also involve designs for and fabrication of implantable medical devices that selectively incorporate biocompatible metals with unique properties to enhance device performance or introduce certain functionalities. Additionally, embodiments of the disclosed subject matter can be for the biocompatible metal pairs extending to other material pairs, such as titanium-aluminum and copper-aluminum for aircraft structure and automobile battery applications, for example.

Various embodiments include joining of two material pairs, stainless steel (SS)-NiTi and Pt-NiTi, for instance, in two joint geometries, wire-wire and sheet-sheet butt joints, for example. The foregoing materials and geometries are mere examples. For instance, SS-superelastic NiTi may be used. Microstructure and strength characterization can be carried out with the results determined and/or recorded, for instance on a computer readable storage medium. The composition and crystal structure of phases formed can be analyzed using Energy Dispersive X-ray Spectroscopy (EDX) and/or Electron Backscatter Diffraction (EBSD), for example. The results may be used to validate modeling and simulation results. Biocompatibility tests of the joints formed and typical device realization also may be performed.

A laser joining process according to embodiments of the disclosed subject matter can form autogenous (no filler material) brazed joints between dissimilar, biocompatible metal pairs. Joined dissimilar materials according to embodiments of the disclosed subject matter may be used in medical devices, for instance. Embodiments of the disclosed subject matter for joining of dissimilar biocompatible materials can introduce unique functionalities through the use of shape memory alloys such as NiTi in conjunction with stainless steel (SS), and/or can maintain corrosion resistance in Pt-to-SS joints.

An endovascular thrombectomy device is shown in FIG. 1A and utilizes an active NiTi shape memory element 102 that reverts to a coiled geometry 102A upon heating to aid in removal of a blood clot 104. A stainless steel wire 108 (SS) on a distal end is used to aid in navigation of the device through the vasculature. A laser welding process according to embodiments of the disclosed subject matter can enable seamless joining of these components and can eliminate the need for adhesives.

Figure 1B:
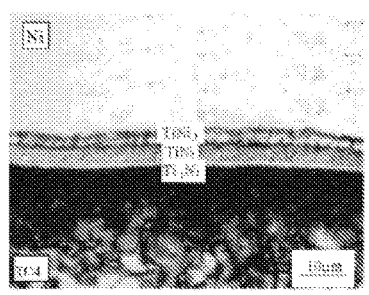
FIG. 1B shows an SEM image of intermetallic layer (TiNi3, TiNi, and Ti2Ni) formation at the interface of a Ti-6Al-4V (TC4) to Ni joint.

FIG. 1B shows an SEM image of intermetallic layer (TiNi3, TiNi, and Ti2Ni) formation at the interface of a Ti-6Al-4V (TC4) to Ni joint.

An autogenous brazing process according to embodiments of the disclosed subject matter can eliminate the need for filler material or materials, while minimizing or eliminating the formation of intermetallics within dissimilar metal joints by limiting melting to one material and rapidly cooling the molten metal on the adjoining dissimilar material.

Figure 2:
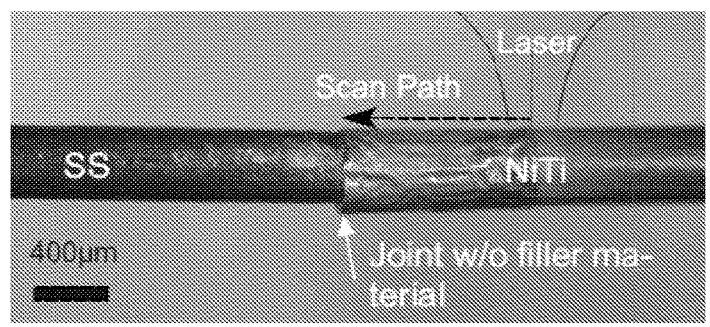
FIG. 2 is an Optical micrograph of autogenous laser brazed joint of stainless steel-NiTi wires.
Figure 3A:
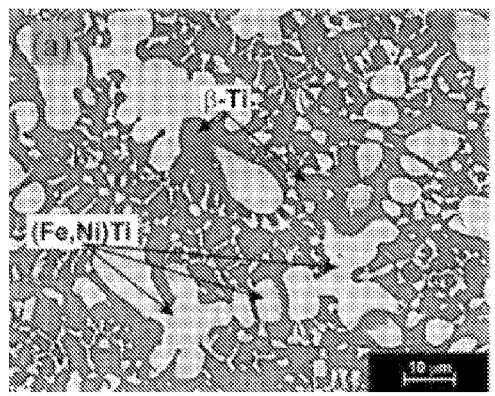
FIG. 3A shows two phase $\beta$-Ti/(Fe,Ni)Ti microstructure typical of SS-Ti fusion welds with low cooling rates
Figure 3B:
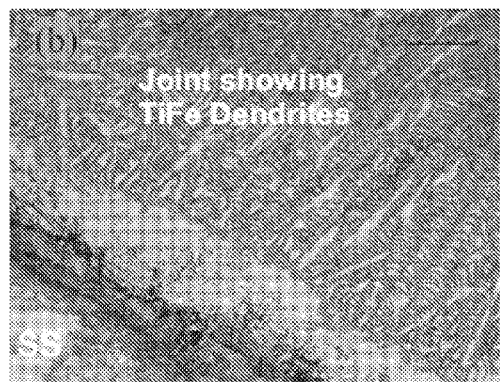
FIG. 3B shows TiFe dendrites within $\beta$-Ti matrix in SS-Ti dissimilar joint formed at moderate cooling rate (Ti not shown).

FIG. 2 shows a joint formed between a NiTi and SS wires using an autogenous laser brazing process according to embodiments of the disclosed subject matter. An autogenous laser brazing process to form robust joints between biocompatible dissimilar metals that aims to mitigate brittle intermetallic formation through strict control over cooling rates and joint compositions.

Generally speaking, joint formation according to embodiments of the disclosed subject matter can include providing two dissimilar metals in any suitable form, such as a wire or a plate. One of the base materials in the dissimilar metal pair is melted, wetted, and solidified on the adjacent component to form a joint. Note that it is not required that the two different materials being joined have different melt temperatures. Thus, the melting temperatures may be the same or different. Melting may be restricted to one of the materials through use of the interface thermal resistance.

The joint can be formed when two dissimilar metal components are placed in a butt joint configuration and a laser beam is scanned along one component toward the joint interface. Laser parameters (power, scan velocity, beam shape, beam size) may be controlled such that the equilibrium temperature of the irradiated material is below its melting point.

As the laser beam approaches the interface between the two materials, the thermal resistance across the interface causes heat to accumulate at the interface in the irradiated component causing it to melt. This molten material comes in intimate contact with the adjacent component through wetting and forms a metallic bond. The laser beam may be shut off or reduced once this occurs to ensure that melting of the second component does not occur. The formation of brittle phases can be mitigated or eliminated by ensuring that only one material is melted and is relatively quickly cooled upon coming in contact with the adjacent component.

Figure 5B:
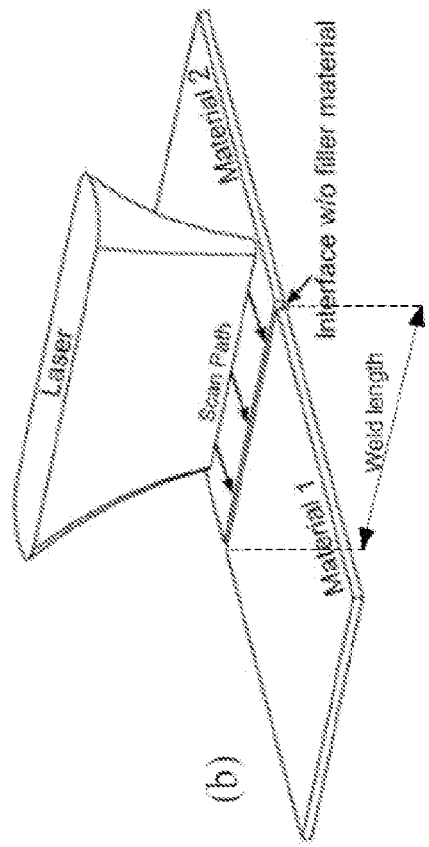
FIG. 5B is a schematic diagram of an autogenous laser brazing system or device according to embodiments of the disclosed subject matter for sheet-sheet (a few mm in weld length) butt geometries. Sheet-sheet can use a rectangular beam shape formed using cylindrical lenses.
Figure 5A:
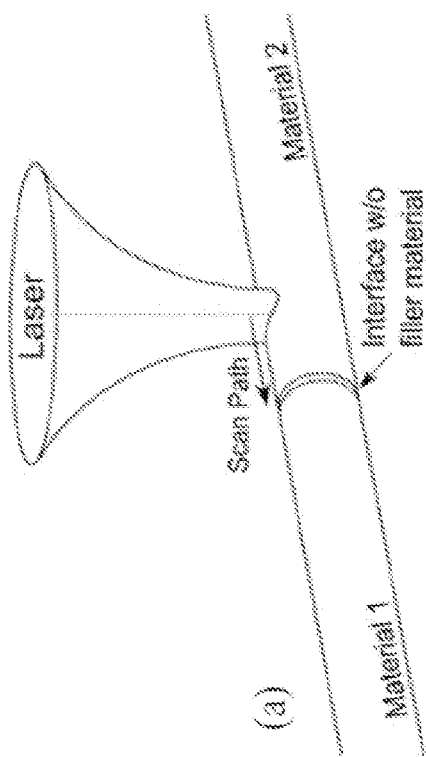
FIG. 5A is a schematic diagram of an autogenous laser brazing system or device according to embodiments of the disclosed subject matter for wire-wire (e.g., a few hundred microns in diameter) geometries. Wire-wire can utilizes a Gaussian laser intensity distribution.

An autogenous laser brazing process according to embodiments of the disclosed subject matter involves joining (e.g., butt joining) of dissimilar metals in micro-scale devices. In the case of butt joining, the joined dissimilar metals may take any suitable shape, such as two wires (FIG. 5a) or two sheets (FIG. 5b). Butt joints are widely used in medical devices, for instance, in order to minimize crevice formation and to aid in sterilization of the joined components.

The joining process can involve laser irradiation of one material starting some distance away from and moving toward the dissimilar metal interface. Laser parameters such as power and speed can be chosen such that the equilibrium temperature of the irradiated piece does not exceed its melting temperature. Heat accumulation due to the thermal resistance of the interface can cause the temperature at the interface to rise above the melting temperature of the irradiated material as the laser beam approaches, forming a molten pool. The laser beam can be turned off as the spot reaches the interface and the melt pool is quenched when it comes in contact with the adjacent cold workpiece forming an autogenous braze joint.

This process can minimize mixing of the two materials due to the minimal melt volume, a high quench rate, and localized melting of one side of the weld joint. This process is also autogenous, eliminating the need for filler materials when joining metallurgically incompatible materials with similar melting temperatures. While quenching of steels often hardens and embrittles the material due to the formation of martensite, austenitic stainless steels used in medical devices cannot be hardened using thermal processes. Thus the high cooling rate in the autogenous laser brazing process does not embrittle joints in such materials.

Thermal modeling of the joining process can be performed using a 3-dimensional finite element code that models half of each of the wires with a symmetric boundary condition on the plane of symmetry to reduce computation time. The laser beam was modeled as a Gaussian beam travelling at a constant velocity across the top of one wire as $$Q = Q_{max} * \exp(-3/R_o^2 * \sqrt{((X-X_o)^2 + (Y-(Y_o+Vt))^2)^2}) \tag{1}$$

Where Q is the flux at point (X,Y), $Q_{max}$ is the peak flux, $R_o$ is the beam spot size, $X_o$ and $Y_o$ are the initial position of the laser spot, V is the scan velocity, and t is time. Thermal contact conductance across the dissimilar metal interface is modeled as a step function as a function of temperature with the contact conductance increasing from 1000 for solid-solid contact to 3000 for solid-liquid contact. The contact conductance is spatially resolved over the wire-wire interface allowing for more accurate modeling of the melting phenomenon.

Figure 6:
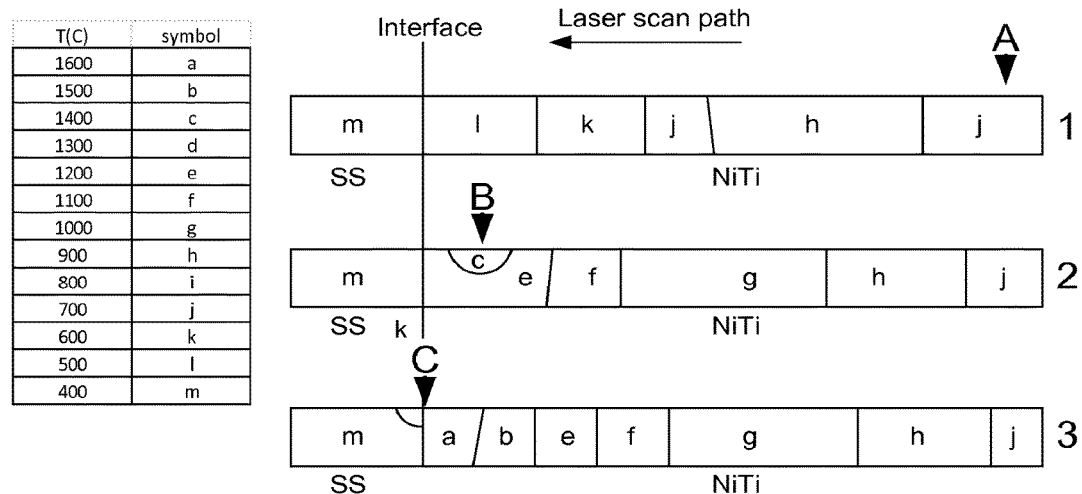
FIG. 6 shows thermal modeling of an autogenous laser brazing process according to embodiments of the disclosed subject matter showing thermal accumulation at joint interface as laser beam approaches.

Wire joining can be performed using a similarly sized Gaussian laser beam spot while sheet joining can be performed using a rectangular laser spot, for example, both scanned toward the interface rather than along it as shown in FIG. 6. (See discussion of FIG. 6 further below) The use of appropriate beam shapes allows for greater homogeneity in temperature on the joint surface.

Figure 7:
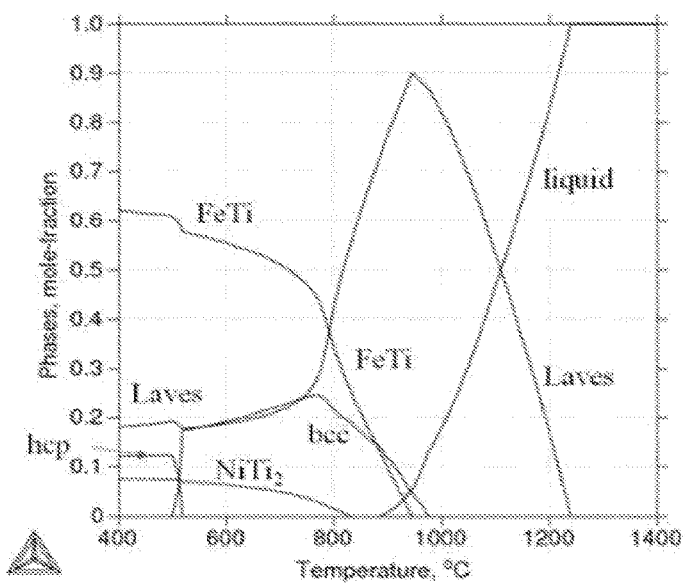
FIG. 7 shows an equilibrium phase development simulation for solidification of stainless steel-titanium mixture with composition of 37.00% Fe, 46.59% Ti, 10.70% Cr, 2.95% Ni, 2.47% Mn, 0.29 at % showing formation of multiple intermetallic phases including FeTi, NiTi2, and TiFe2.

The prediction of the phases formed in mixtures of metals can be used to develop a robust joining process for all dissimilar material combinations. For slow cooling rates or prolonged thermal processes equilibrium phase diagrams are appropriate for phase prediction, however, these diagrams are not easily extended past a few components making them impractical for joining of alloy pairs such as NiTi and stainless steel. Phase prediction in multi-component systems has been performed using numerical thermodynamics methods and is based on the calculation of the free energy curves of different components in the material as a function of temperature, T, pressure, P, and composition, X. For a mechanical mixture between two pure components the free energy can be written as the following:

$$G^M = X_A H_A + X_B H_B - T(X_A S_A + X_B S_B) \tag{2}$$

where $X_i$ are the mole fractions, $H_i$ are the enthalpies, and $S_i$ are the entropies of the pure components A and B. If, however, a solution is created, the free energy is written as $G^S = X_A \underline{H}_A + X_B \underline{H}_B - T(X_A \underline{S}_A + XBSB - T\Delta SM)$, where underlined quantities indicate values when in solution and, $\Delta SM$ is the entropy of mixing (configurational entropy). For dilute solutions the configurational entropy can be written as $\Delta SM = -R(X_A \ln X_A + X_B \ln X_B)$. For non-ideal solutions the free energy is written as the following:

$$G^S = G^M + \Delta H^{xs} - T\Delta S^{xs} - T\Delta S_M \tag{3}$$

where superscript xs indicates values relative to an ideal solution. Once these curves are known for each phase in the material, they can be plotted together as a function of composition at various temperatures (typically pressure is held constant). The stable phase is determined by considering which phase has the lowest free energy at each composition. Plotting these points in temperature-composition space allows the calculation of phase boundaries and thus the complete phase diagram. In order to extend these equations past binary combinations, extra terms are added for each new component and free energy "surfaces" are plotted rather than curves. The phases formed during solidification of a material with a particular composition can then be determined using this data. A preliminary phase development chart showing the mole-fraction of each phase predicted during equilibrium cooling of a Titanium-Stainless Steel material pair is shown in FIG. 7. While equilibrium phase prediction has been successfully used for a variety of metal joining processes, its lack of spatial resolution and assumption of a slow cooling rate can create significant discrepancies in processes where incomplete mixing and high cooling rates are observed. The autogenous laser brazing process is being developed to provide a high quench rate and minimize mixing of the dissimilar material pair. Phase prediction in such an environment requires both spatial resolution and non-equilibrium based solidification models.

Spatially resolved models of the diffusion of Nickel-based filler material components into stainless steel during the diffusion brazing processes have been reported and have considered the effects of interface motion and diffusion coefficient temperature dependence on the compositional profile within the joint. The formation of intermetallics in diffusion-based processes has been studied and their distribution within a joint is suggested to be controlled by the free energies of formation of different phases and the flux ratio, y, of components across the interface which is written as the following:

$$\gamma = \frac{J^M}{J^N} = \frac{\sqrt{D_A^M D_B^M}\,(C_A^{bM} - C_A^M)\left(C_B^{bN}\sqrt{D_B^N} + C_A^N\sqrt{D_A^N}\right)}{\sqrt{D_A^N D_B^N}\,(C_B^{bN} - C_B^N)\left(C_A^{bM}\sqrt{D_A^M} + C_B^M\sqrt{D_B^M}\right)} \quad (4)$$

where J are the diffusion fluxes, D are the diffusion coefficients, C are the initial concentrations, $C^b$ are the maximum solubilities, subscripts A and B indicate different base materials, and superscripts M and N indicate different components. While this model introduces one-dimensional spatial resolution, it still relies on the equilibrium calculations for determination free energy curves.

Figure 8C:
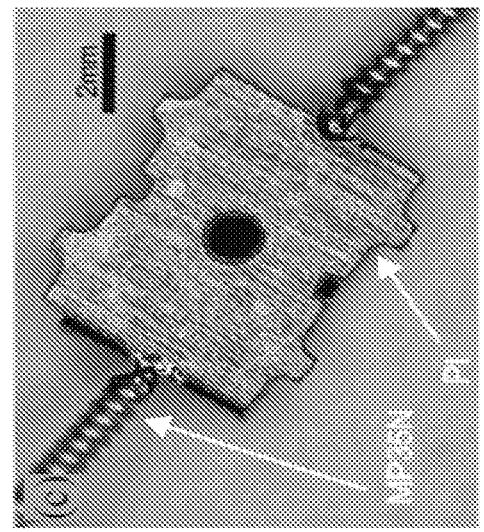
FIG. 8C shows 0.035" wire diameter single filar MP35N micro-coil laser welded to 0.003" thick Platinum used as an electrical conductor.
Figure 8B:
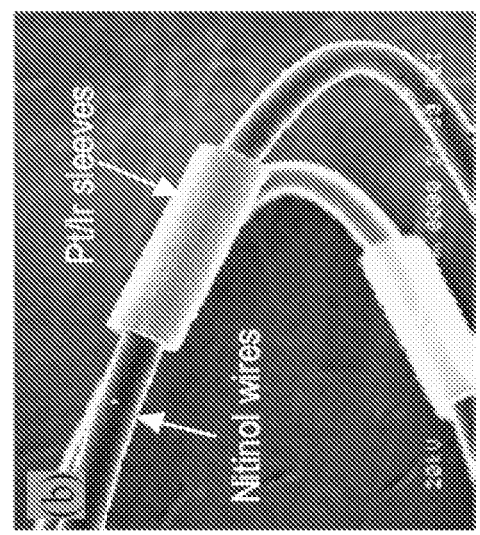
FIG. 8B shows Pt/Ir sleeves attached to a NiTi wire stent for enhanced radiopacity. The Pt-NiTi pair forms brittle intermetallics.
Figure 8A:
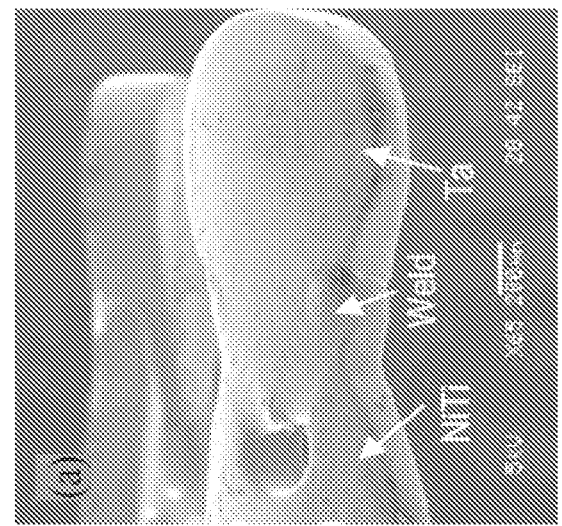
FIG. 8A shows radiopaque tantalum marker laser welded to NiTi stent for fluoroscopic visibility.

FIG. 8a shows a SEM image of a tantalum marker paddle laser welded to the end of a Nitinol (NiTi) endovascular stent. Nitinol is used in stents due to its biocompatibility and its superelastic properties which allows the stent to expand and exert a chronic outward force on the vasculature. The limited radiopacity of Nitinol, however, may cause poor visibility through x-ray imaging. The incorporation of small markers made of radiopaque, biocompatible materials such as tantalum, gold, and platinum allow for stent placement and shape to be monitored through fluoroscopic or magnetic resonance imaging techniques. FIG. 8b shows Pt/Ir sleeves attached to a wire stent for enhanced fluoroscopic visibility. The Ta marker paddles laser welded to the Nitinol stent in FIG. 8a are also used for their radiopacity but can suffer from brittle intermetallic formation at the dissimilar metal weld joint. The ability to form seamless, robust joints between these materials can allow for highly visible stents while minimizing crevice formation and the risk of restenosis or thrombosis. The need to join biocompatible dissimilar metal pairs also comes from other properties such as electrical conductivity. FIG. 8c shows single filar micro-coils made of MP35N, a cobalt-based biocompatible alloy, attached to a Pt conductor. Pt is often used as a conductor due to its high electrical conductivity. When combined with its exceptionally inert nature, Pt becomes the ideal material for electrical leads in pacemakers and Cardioverter Difibrillators (ICDs) where it must be in constant, long-term contact with and provide reliable electrical stimulus to heart tissue.

Two separate biocompatible material pairs are chosen: NiTi-stainless steel (SS) and NiTi-Pt. The shape memory and superelastic properties of NiTi are unique amongst biomaterials and will enable novel functionalities in medical devices, for example. Successful joining to stainless steel will enable the design and manufacture of low-cost devices with the selective use of functional materials. Pt, with its exceptional biocompatibility, electrical conductivity, and radiopacity is a critical component in many medical devices such as stents (FIG. 8b) and pacemakers. Selective joining of NiTi and Pt will address many of the weaknesses of NiTi while controlling device cost. Both of these material pairs are known to form brittle intermetallic phases when mixed. Since composition is the main determinant of NiTi's mechanical properties, two NiTi material compositions can be used, one that is slightly Ti-rich for shape memory properties and one that is slightly Ni-rich for superelastic properties. Two different joint geometries can be implemented (FIGS. 5A, 5B), the butt welding of wires on the order of a few hundred microns in diameter, for instance, and the butt welding of sheets with sub-millimeter thickness and weld length in the range of millimeters, for example. These sizes are typical of materials used in micro-scale medical devices.

A laser system, such as an Nd-YAG (A=1.064 nm) laser system operated in the continuous wave mode can be used for irradiation. For autogenous laser brazing of sheets a rectangular beam similar in size to the length of the joint can be achieved through beam-shaping optics (cylindrical lenses). Sample offset from the focal position of the laser can be used for laser spot size control (minimum ~10 μm) and variable beam power through the use of crossed-polarizer attenuators will allow for beam intensity control. An inert shielding gas, argon, may be supplied to the brazing joint during processing to minimize oxidation of the samples.

Several different processing parameters can be varied. For example, parameters such as laser scanning speed, scan length, and laser power can be varied. Process design can be investigated or further investigated through the study of laser scan path (i.e. straight, helical), choice of irradiated sample, and sample preheating/cooling. Varying the laser scan path can allow control over the spatial and temporal thermal profiles and the choice over which material to irradiate will have significant implications on the joining process due to differences in thermal properties (i.e. melting temperature, thermal conductivity) as well as laser absorptivity and sample heat sensitivity (i.e. vaporization of low vaporization temperature elements in alloys and phase transformations in SMAs). Sample preheating or cooling may be beneficial for joining by controlling diffusion, as well as varying quench rates and wetting parameters.

Joint morphology can be observed through the use of differential interference contrast (DIC)-enhanced optical microscopy (FIG. 9A) while scanning electron microscopy (SEM) will be used for fracture surface and microstructure analysis. An experimental study of diffusion through compositional analysis of autogenous laser brazed joints will utilize spatially-resolved, line-scan energy dispersive x-ray spectroscopy (EDX) profiles across the joining interface. FIG. 9B shows line-scan composition profiles observed at the interface of a Ti-SS dissimilar joint formed at a high cooling rate. A transition region roughly 6 μm wide is observed between the two base materials with a roughly constant composition. Interdiffusion between Ti and SS components (Fe and Cr) is also observed. Care is cautioned in forming conclusions on the phases formed in such instances solely from compositional analysis and equilibrium phase diagrams. More definitive phase identification can be performed by also determining crystal structure through the use of electron backscatter diffraction (EBSD).

Figure 9C:
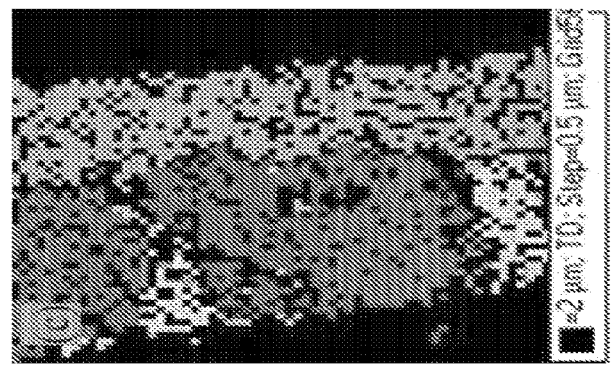
FIG. 9C shows results of an EBSD Euler angle map of region with homogenous composition shown in FIG. 9B. Multiple grains are observed but all exhibit the same BCC structure. Composition and crystal structure information indicate that the joint consists of a supersaturated β-Ti(Fe) single phase microstructure.
Figure 9B:
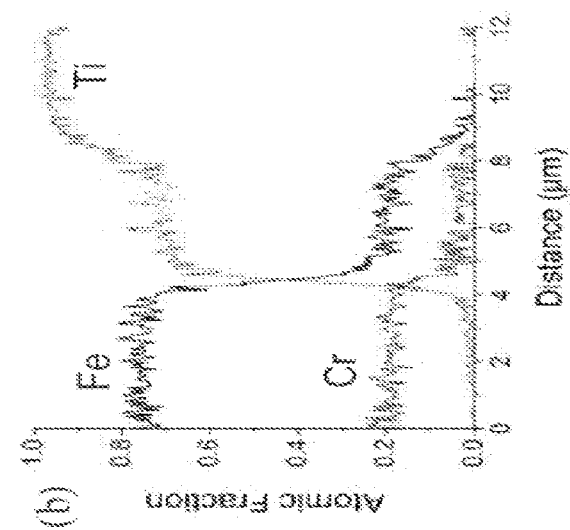
FIG. 9B shows results of an EDX line scan across SS-Ti interface shown in FIG. 9A. A near-uniform composition within the joint is observed with diffusion of Fe and Cr from the stainless steel into Ti and of Ti into SS also captured.
Figure 9A:
FIG. 9A shows results of an optical micrograph of SS-Ti joint formed at high cooling rate without filler materials.

FIG. 9C shows an EBSD Euler angle map of the transition region whose composition is shown in FIG. 9B. A number of grains are observed in this region but all show the same BCC crystal structure. This information, in conjunction with the compositional profile obtained through EDX indicates that this is a single-phase region of supersaturated Ti(Fe). Such structures can form in high-cooling rate scenarios in Ti-Fe mixtures. The combination of EBSD structural analysis and EDX composition mapping, both at submicron spatial resolutions can allow positive identification of both equilibrium and possible metastable phases including solid solutions and intermetallics. The high spatial resolution of ED X and EBSD, which are in the sub-micron range, can also allow for phase identification in fine microstructures such as those shown in FIG. 4B.

Analysis of the physical and mechanical properties of autogenous laser brazed joints can be performed using both global and spatially-resolved methods. Joint strength can be determined using tensile testing per ASTM standard E8, for instance. Spatially-resolved measurements of material properties in and surrounding the joints can be performed using nano-indentation. The small indentation depth of nano-indentation can allow for high spatial resolution on the order of micrometers. Additionally, nano-indentation can be instrumented, which can enable the capture of load-penetration curves for determination of elastic modulus, dissipated energy, and depth recovery, the latter two of which may be useful for characterization of shape memory and superelastic properties in shape memory alloys. Since NiTi is used in medical devices nearly exclusively for these properties, the continued existence of these unique functionalities after joining should be verified. Loss of shape memory functionalities at and surrounding dissimilar joints, however, may be of concern in micro-scale devices.

Figure 11:
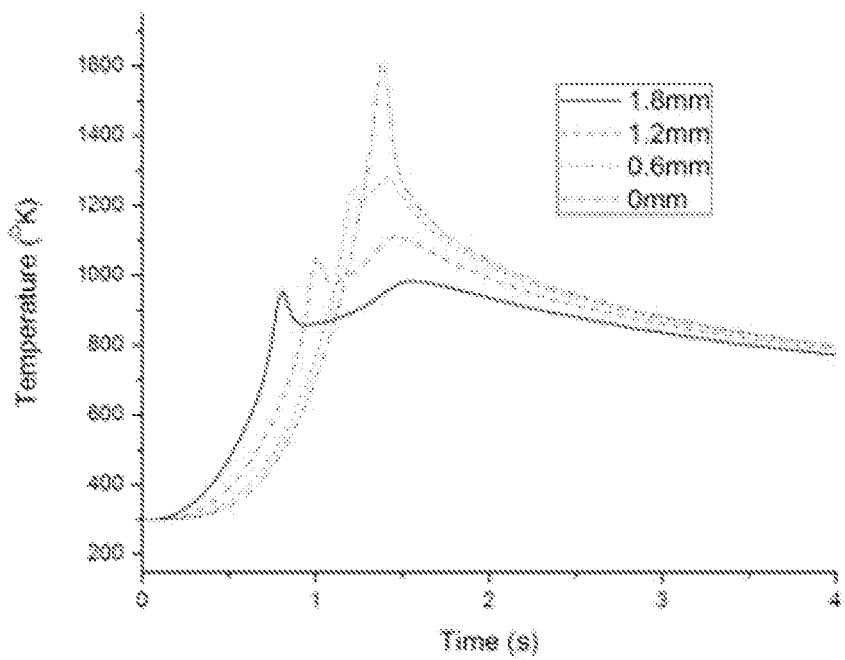
FIG. 11 shows results of simulated temperature time history curves for points at various distances away from the joint interface during the autogenous laser brazing process.
Figure 12:
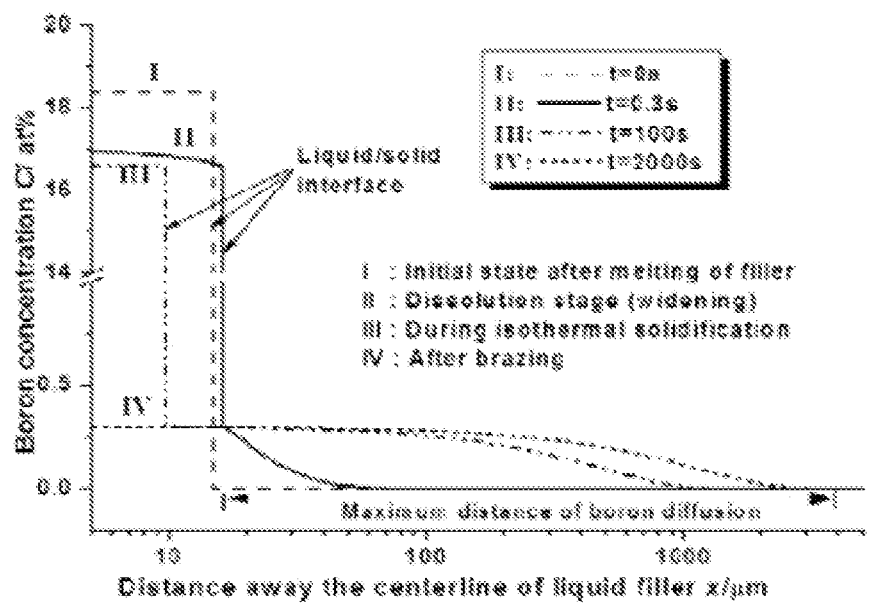
FIG. 12 shows results of simulated concentration profiles of boron as a function of position and liquid/solid interface position at different times during the diffusion brazing process.

An aspect of joints is the failure mechanism, whether brittle or ductile fracture. The formation of brittle intermetallic phases in many dissimilar metal joints can result in failure by brittle fracture. Determination of failure mode can be performed through destructive testing and fracture surface analysis. Fracture surfaces obtained through tensile testing of Ti-SS dissimilar metal joints at low and high cooling rates are shown in FIG. 11.

Figure 10A:
FIG. 10A shows an SEM image of fracture surfaces for joints formed at a low and cooling rate.
Figure 10B:
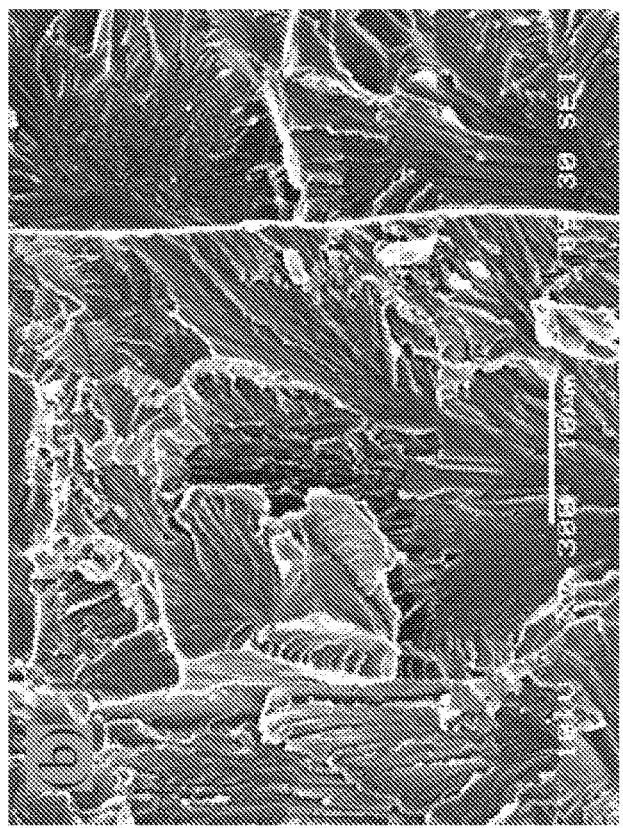
FIG. 10B shows an SEM image of fracture surfaces for joints formed at a high and cooling rate. Note large smooth areas on fracture surface in (a) and significantly rougher surface for (b) even at higher magnification. Joint microstructure in (a) was shown to consist of TiFe intermetallic dendrites within a matrix while (b) was shown to consist of single-phase supersaturated β-Ti(Fe).

Large, flat fracture surfaces are observed in low cooling rate samples with EDX and EBSD analysis confirming the formation of brittle TiFe intermetallics dendrites in a β-Ti matrix. High cooling rate samples exhibited much rougher fracture surfaces, even when observed at significantly higher magnifications (FIG. 10A). Phase analysis of this region suggested the formation of supersaturated β-Ti(Fe). Fracture surfaces of joints prepared using the autogenous laser brazing process may resemble the surface shown in FIG. 10B. This surface morphology represents a significant increase in fracture surface area compared to the fracture surfaces observed in low cooling rate samples (FIG. 10A) indicating a higher energy requirement for crack propagation.

While single materials have been extensively tested for biocompatibility for a number of different applications (long term implant, short-term implant, tissue-engineering), the joints between them have not. Typical tests for biocompatibility and corrosion resistance are performed using immersion in simulated body fluids or through potentiodynamic tests. It has been suggested that the corrosion resistances of NiTi and stainless steel are strong functions of their surface roughness and finish. Due to the requirement for melting of one material in the proposed autogenous laser brazing process, the surface roughness and finish of at least one material is expected to change with an expected change in the corrosion resistance. In addition, the diffusion of components between the dissimilar material pairs may result in the formation of new phases or diminish the formation of common passivating phases such as Ti-oxides resulting in reduced biocompatibility. Even without changes in phase formation, the existence of a dissimilar metal pair can lead to galvanic corrosion due to the different nobility of the metals involved.

Surface roughness can be characterized through the use of optical profilometry or AFM measurements after joining. Corrosion susceptibilities can then be determined through measurement of breakdown potentials per ASTM F2129 in simulated physiological solutions (ASTM 2008). It has been suggested that breakdown potentials greater than 500 mV are sufficient for medical implants. Additional information on potential effects after implantation can be analyzed through the measurement of human cell proliferation in vitro.

The formation of brittle intermetallics in dissimilar metal joints has largely been investigated using equilibrium calculations and a typical result was shown in FIG. 8. These methods have predicted the formation of intermetallics in a variety of joining processes with low cooling rates as they most resemble equilibrium solidification conditions. Two methods may be used for capturing high cooling rate phenomena and for developing spatially resolved prediction capabilities for the proposed autogenous laser brazing process.

A concept of restricted equilibrium phase diagrams was developed to consider finite cooling rate processes. These diagrams assume complete mixing in the liquid and allows for diffusion in the solid state during solidification using a Schiel-based criteria. While equilibrium calculations allow for complete homogenization of the liquid and solid regions, high cooling rates can cause redistribution of solute within both regions resulting in the formation of different phases at different temperatures than predicted by equilibrium phase diagrams. This methodology can be extended to multicomponent alloys for prediction of phases in more complex systems. To include cooling rate effects, a velocity-dependent partition coefficient, $k_v$, is introduced which defines the ratio of solute concentration in the solid, Cs, and in the liquid, $C_L$, and considers solute trapping due to high cooling rate and is as follows:

$$k_v = \frac{a_o v/D_i + K_e}{a_o v/Di + 1 - (1 - \kappa_e)c_{Lv}} \quad (5)$$

where $D_i$ is the interface diffusion coefficient, v is velocity, CLv is the velocity-dependent liquidus concentration, $a_o$ is the solute trapping parameter, and ICe is the partitioning parameter defined as the following:

$$K_e = k_e(1 - c_{Se})/(1 - c_{Le}) \quad (6)$$

where $k_e$ is the equilibrium partition coefficient, and $C_{Se}$ and $C_{Le}$ are the equilibrium solidus and liquidus concentrations. Diffusion in the solid phase is calculated using Fick's second law $$\frac{\partial c_{Sz}}{\partial t} = D_{Sz}\frac{\partial^2 c_{Sz}}{\partial x^2} \quad (7)$$

where t is time, subscript z indicates the $z^{th}$ element in the solid phase and $c_{Sz}$ is its concentration, and $D_{sz}$ is its diffusion constant in the solid phase. The liquidus concentrations C*Lz are then determined iteratively to meet the mass balance requirement. A new restricted-equilibrium phase diagram is then calculated by iteratively solving the above eqs. numerically using a known cooling curve.

Determination of the cooling curve is performed by solving the Fourier heat equation for each joint geometry (butt joining of wires or sheets). Temperature contours for the autogenous laser brazing of dissimilar wires were shown in FIG. 7.

FIG. 11 shows the temperature time histories of four points located different distances from the brazing interface. Thermal accumulation at the interface, evidenced by the significant increase in peak temperature relative to the other three points, is observed.

The heat transfer across the interface (gap conductance) in the thermal model will be revised to take into account the formation of a direct connection between the two materials after the molten pool has wetted the adjacent surface rather than the solely temperature dependent criteria used in the preliminary analysis.

While the restricted equilibrium phase diagrams provide valuable information concerning the phases formed at finite cooling rates, they lack the spatial resolution necessary to accurately predict the phase distributions expected in dissimilar metal joints. Modeling of the diffusion brazing of stainless steel joints using BNi-2, a Nickel-based material supersaturated with boron, as a filler alloy has been performed. The diffusion brazing process is isothermal and relies on the melting of the filler material followed by diffusion of boron, a melting point depressant, out of the joint resulting in solidification of the filler. The diffusion of the solute, in this case boron, is considered to follow Fick's second law as $$\frac{\partial C(x,t)}{\partial t} = \frac{\partial}{\partial x}\left[D(T)\frac{\partial C(x,t)}{\partial x}\right] \quad (8)$$

where C is concentration, t is time, x is position, and D is the temperature dependent diffusion coefficient. A planar interface is assumed which enables one-dimensional diffusion to be modeled. Equation (8) is used for diffusion in both the liquid and solid with only the diffusion coefficient being changed to $D_L$ and Ds respectively. The boundary condition at the interface, which is calculated assuming local equilibrium and solute conservation, is written as $$(C_S - C_L)\frac{ds(t)}{dt} = D_L\frac{\partial C(x,t)}{\partial x}\bigg|_{x=s-} - D_S\frac{\partial C(x,t)}{\partial x}\bigg|_{x=s+} \quad (9)$$

where s(t) describes the position of the solid-liquid interface, and $C_s$ and $C_L$ are the equilibrium solidus and liquidus concentrations as defined by the equilibrium phase diagram. In this formulation the coordinate system is transformed in order to fix the liquid-solid interface. Two forms of equation (8), one for the solid and one for the liquid, along with equation (9) are simultaneously solved using an iterative finite difference method in the new coordinate system. FIG. 13 shows the simulated boron concentration profiles and liquid/solid interface positions as a function of time for the stainless steel similar brazing process.

The spatial resolution of this model enables observation of interface events not captured by the restricted equilibrium phase diagram calculations such as solutal melting of the base material as the solidus/liquid temperatures change with composition. In order to make this model, which assumes isothermal solidification and uses binary equilibrium phase diagrams for liquidus and solidus concentrations, applicable to the proposed process a number of modifications will be made. The proposed autogenous laser brazing process uses a high cooling rate to minimize diffusion and mixing of the two base materials and thus cannot be simplified to an isothermal case. A number of different parameters will be updated to account for the finite cooling rate, the first being the temperature and composition dependence of the diffusion coefficients. The temperature dependence will be captured using the Arrhenius relation $D(T)=D_o\exp(-Q/RT)$, where Do is the reference diffusion coefficient, Q is the activation energy for diffusion, and R is the gas constant. Diffusion in alloys is also different from the binary case. Such differences will be critical for modeling of multi-component joints such as SS-NiTi and Pt-NiTi. These changes can be captured by implementing a generalized Fick's second law written as the following:

$$\frac{\partial C_i}{\partial t} = \sum_{j=1}^{N-1}\frac{\partial}{\partial x}\left(D_{ij}\frac{\partial C_i}{\partial x}\right) \quad (10)$$

Finally, the solidus and liquidus concentrations currently derived from equilibrium phase diagrams will be replaced with values from restricted equilibrium phase diagrams for multi-component systems. The thermal distribution during application of the proposed autogenous laser brazing process is designed and expected to be uniform in the plane of the joint and thus a one-dimensional model will provide nearly the same level of information as a comparable three-dimensional model in this case and is expected to be suitable for both plate and wire welding scenarios. The composition profiles and interface motion determined by the diffusion model will be used to determine phase formation in the joint using the restricted equilibrium phase diagrams.

An autogenous laser brazing process (and system and device thereof) can be applied toward the fabrication and demonstration of any suitable medical device, for example. One is likely a functional shape memory device similar to the one shown in FIG. 1 where a NiTi wire is joined with a SS wire. NiTi components may be "trained" to recover to a particular shape upon heating as shown in FIG. 1 where actuation is required. The second device is a stent fluoroscopic marker integration similar to the ones shown in FIGS. 8A and 8B where a highly inert and radiopaque Pt tip is welded to a NiTi stent. The Pt tip and the NiTi stent are slightly out of plane and their profiles are curved. These features will be used to test the proposed autogenous laser brazing process in a more realistic configuration.

Working examples are now described. NiTi and stainless steel 316L wires, roughly 380 and 368 µm in diameter, respectively, were cut to 7 inch lengths from spools. One end of each wire was ground flat with the surface perpendicular to the axis of the wire using 800 grit silicon carbide paper. Wires were cleaned in an ultrasonic bath of acetone for 15 minutes prior to assembly in a welding fixture. The welding fixture consisted of a pair of coaxial micro chucks, one holding a stainless steel tube slightly larger than the diameter of the wires. The wire sample to be irradiated by the laser was placed in the tube and allowed to protrude roughly 5 mm from the end with the ground end facing the adjacent chuck. The second wire was fixed in the other chuck with its ground end facing the end of the tube. The ground faces of the samples were held together using an axial force applied by a spring on the wire to be irradiated. The axial force on the wires was set to a range between 0.05 and 0.15N by adjusting the compressed length of the spring.

Irradiation along both the stainless steel and NiTi wires was performed using a continuous wave Nd:YAG laser operating at a wavelength of 1064 nm. The Gaussian spot was controlled to be the same size as the diameter of the wires. Laser power was adjusted up to a maximum of 4.75 W while scan speed and scan distance were adjusted between 0.2 and 1 mm/s and 1 and 2.5 mm respectively. The laser irradiation was stopped 100 µm from the joint interface in order to minimize unnecessary heating of the un-irradiated wire. The sample was allowed to accelerate prior to laser irradiation and decelerate after laser irradiation to ensure that sample translation occurred at a constant velocity during processing. Laser joining was performed in an inert environment of ultra-high purity argon gas which was flowed into the welding fixture at a flow rate of 22 cfh.

Figure 13A:
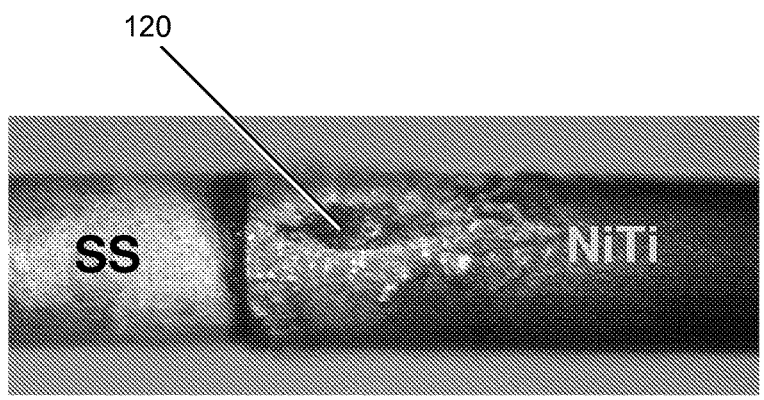
FIG. 13A shows an optical micrograph of dissimilar metal joint between NiTi and Stainless Steel observed from the top.
Figure 13B:
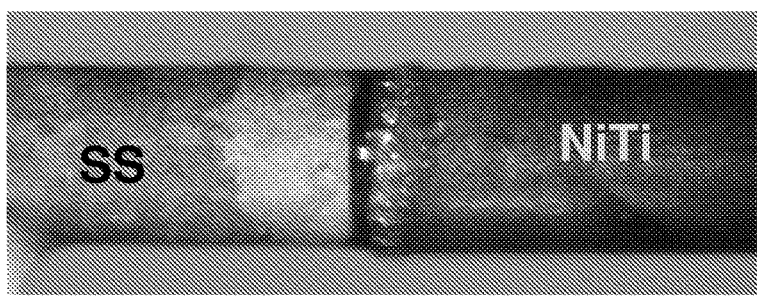
FIGS. 13B and 13C show two sides of the joint of FIG. 13A.
Figure 13C:
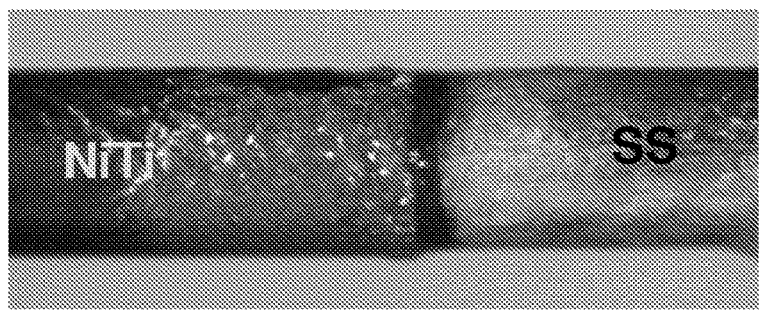

After joining the samples were tested in tension to fracture using a micro-tensile tester with bollard grips using a cross-head speed of 0.5 mm/min. The gauge length was set at 100 mm. Fracture surface analysis was performed using a scanning electron microscope (SEM) while compositional analysis was performed using energy dispersive x-ray spectroscopy (EDS). FIG. 13A shows an optical micrograph of dissimilar metal joint between NiTi and Stainless Steel observed from the top. The two sides are shown in FIGS. 13B and 13C. Sample irradiated on NiTi-side of joint. FIGS. 13A-13C show a typical joint created using the autogenous laser brazing process. This joint was formed using a laser power of 4.75 W directed toward the NiTi wire over a scan length of 2.5 mm at a scan speed of 0.5 mm/s. Overall, the joint shows a clean outward appearance with no obvious signs of porosity or cracking. A dark spot (120 visible in FIG. 13A) on the top of the irradiated NiTi wire is observed along with some roughening of its surface, however, no large-scale deformation of the wire is observed indicating that significant melting of the base materials did not occur during processing. Some bulging is observed very close to the joint interface likely due to the softening of the NiTi as it is heated and the axial force applied on the irradiated wire. This deformation indicates that some softening of the material did occur and that the two wires were forced into contact. This may be advantageous in embodiments of the laser brazing process owing to the greater interface conductance caused by the deformation which may help to limit the temperature increase at the interface and keep the laser from over melting the wire. In contrast to the irradiated, NiTi, side of the joint, the stainless steel side shows no signs of deformation or surface roughening. This indicates that the temperature on that side of the joint was maintained below the melting temperature.

Figure 14:
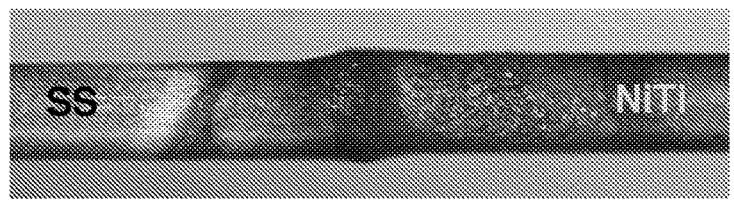
FIG. 14 shows an optical micrograph of dissimilar metal joint between NiTi and Stainless Steel.

FIG. 14 shows a joint that was formed by irradiating the stainless steel side of the joint. No changes in shape were observed on the irradiated side of the joint while the un-irradiated NiTi wire shows some signs of deformation and surface roughening. The fact that the deformation is limited to the un-processed side of the joint is likely due to the lower melting temperature of the NiTi compared to the stainless steel. The equilibrium melting temperature of NiTi is 1310° C. while for stainless steel it is 1375° C. The irradiated material, with its higher melting temperature, conducts enough heat across the interface to the NiTi for it to melt first and limit further increases in temperature through energy used for the latent heat of fusion and the addition of a new thermal conduction pathway along the un-irradiated wire.

Figure 15:
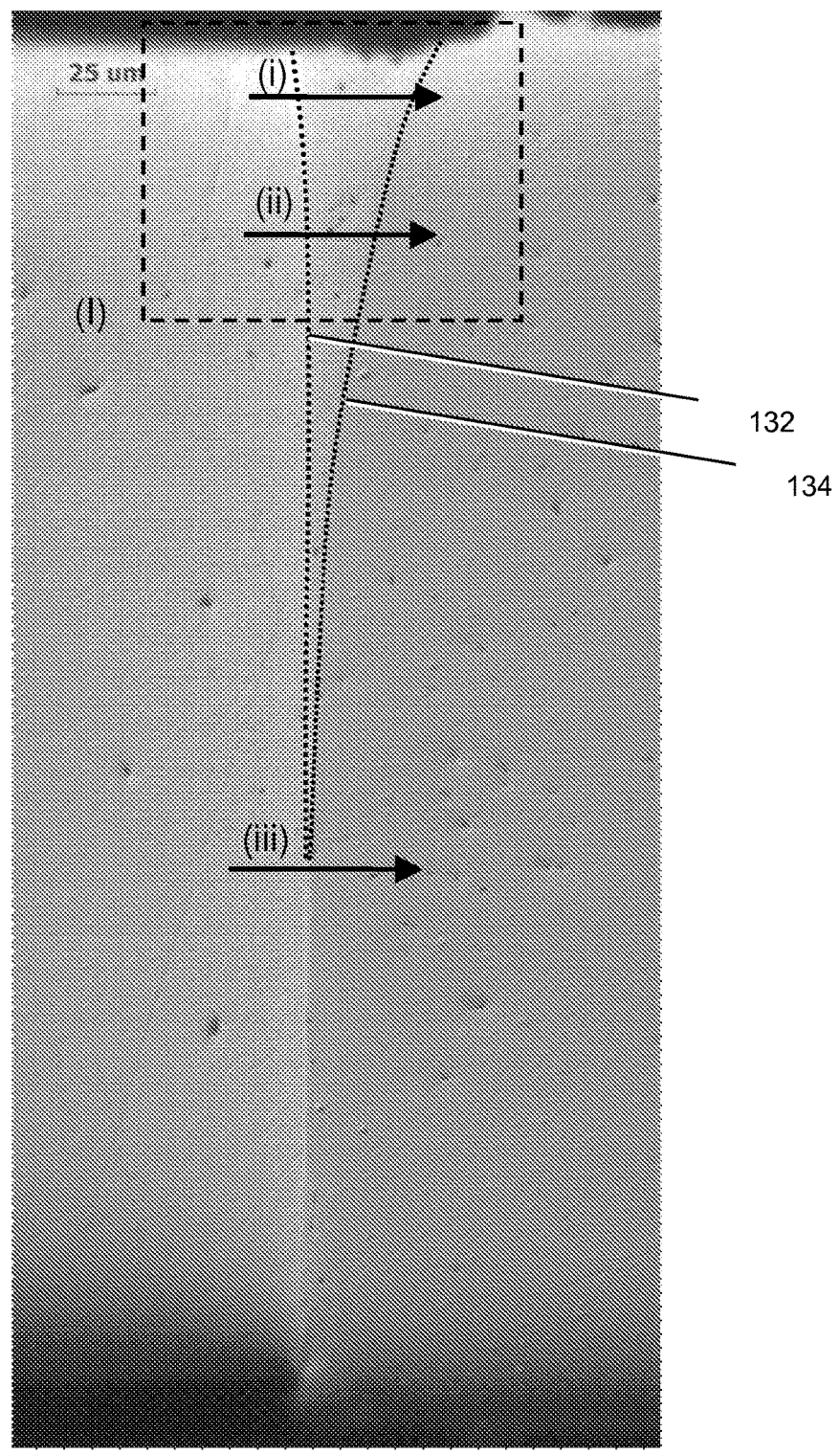
FIG. 15 shows an optical micrograph of the same sample shown in FIGS. 13A to 13C after cross-sectioning along the Y-Z plane.

FIG. 15 is an optical micrograph of the same sample shown in FIGS. 13A to 13C after cross-sectioning along the Y-Z plane. The lines 132 and 134 indicate the approximate boundaries of the segregated and mixed phases of the joined materials. A clean interface was observed with little to no porosity, no cracking, and no signs of incomplete joining at the interface. The joint itself is narrowest toward the center of the wires and wider along the top and bottom surfaces. The increased width toward the top of the joint is likely due to the increased heat flux experienced by the top surface from direct laser irradiation which causes excess melting to occur. The bottom of the joint may experience greater melting due to limited heat transfer at the wire surface. Cross-sections performed on SS-irradiated samples show similar joint morphologies (not shown).

Thermal modeling of the autogenous laser brazing process is performed to understand the thermal profile within the wires during irradiation. FIG. 6 shows temperature contours in a joint pair with the laser directed at the NiTi wire at a number of different times. The positions of illumination by the laser are indicated by letters A, B, and C at respective times 1, 2, and 3, each with a respective contour plot. The temperature profile is indicated by respective. The letter A shows the steady-state temperature distribution around the laser spot far from the wire-wire interface. Thermal accumulation, as evidenced by the increase in peak temperature, is observed as the laser beam approaches the interface at B and C.

In 3D thermograms, some non-uniformity of the temperature at the joint was observed in the thermal model as the laser approaches the interface with the upper region showing a higher temperature consistent with the wider joint observed experimentally toward the top of the wire. Temperature-time profiles at various distances from the interface are shown in FIG. 6. The peak temperature of each point is seen to be a decreasing function of its distance from the joint interface with the faying surface of the joint experiencing the highest temperature rise. This is attributed to the thermal accumulation at the joint due to the imperfect conduction across the interface.

Figure 16A:
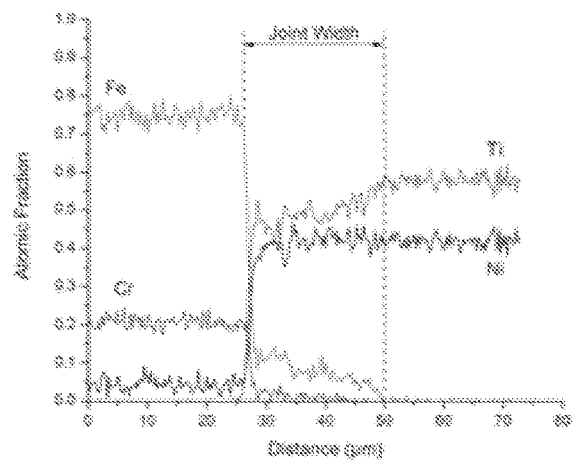
FIG. 16A to 16C shows the composition of metals at an interface at different depths from the irradiated surface.
Figure 16B:
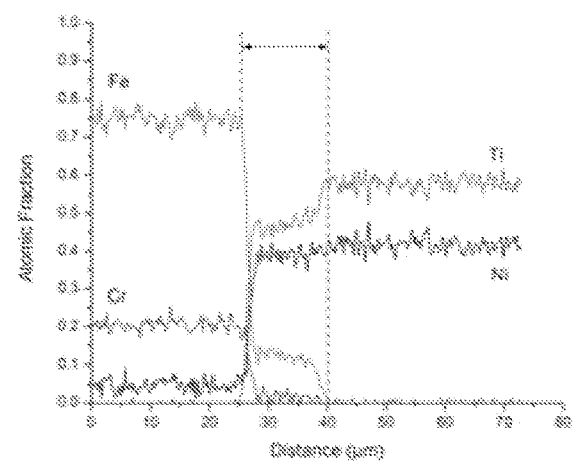
Figure 16C:
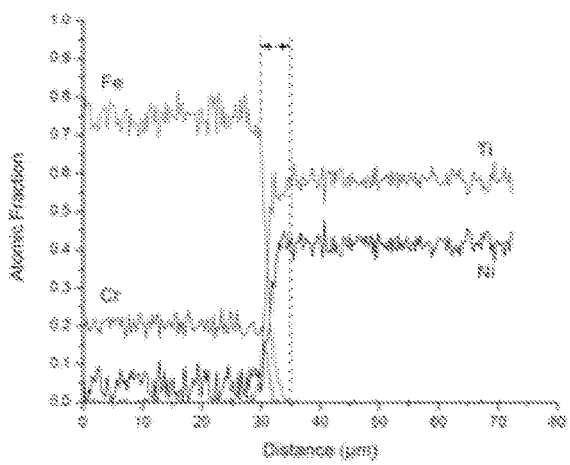

Quantitative EDS profiles performed across the NiTi-SS interface at different depths from the irradiated surface are shown in FIGS. 16A-16C. Each profile shows a constant composition of primarily Fe in the stainless steel and a slightly Ni-rich composition in the NiTi side of the joint. Between the two base metal compositions is the joined region showing a mixture between Fe, Cr, Ni, and Ti in varying proportions. The extent of this mixed region indicates the width of the joint. The uppermost EDS profile (FIG. 16A) shows a joint that is roughly 25 µm wide. A steep dropoff in the iron and chromium composition, from roughly 75 at % Fe and 20 at % Cr to 10 at % Fe and 3 at % Cr, is observed 25 µm from the start of the scan which is the same location at which the Ni and Ti compositions increase significantly, however, an appreciable amount of Fe and Cr are observed to exist roughly 50 µm into the EDS line scan. The second EDS profile (FIG. 16B), performed 50 µm below the first, shows similar characteristics but with the mixed composition region extending only 15 µm from the interface. The third EDS profile (FIG. 16C), performed 175 μm below the first does not show a significant mixed region between the two base materials. The entire transition between materials occurs within 5 μm at this depth. These different composition profiles suggest that different joining mechanisms are dominant along different regions of the joint. Toward the laser irradiated surface the melted layer thickness is greater, which indicates a longer melt duration, allowing greater dilution of the stainless steel into the molten NiTi. Toward the center of the wires, where minimal mixing of the two materials is observed, the melt layer thickness should be significantly smaller. The composition profile in this region resembles more of a diffusion-controlled process while the upper layers resemble more of a fusion-based joining mechanism.

Figure 17:
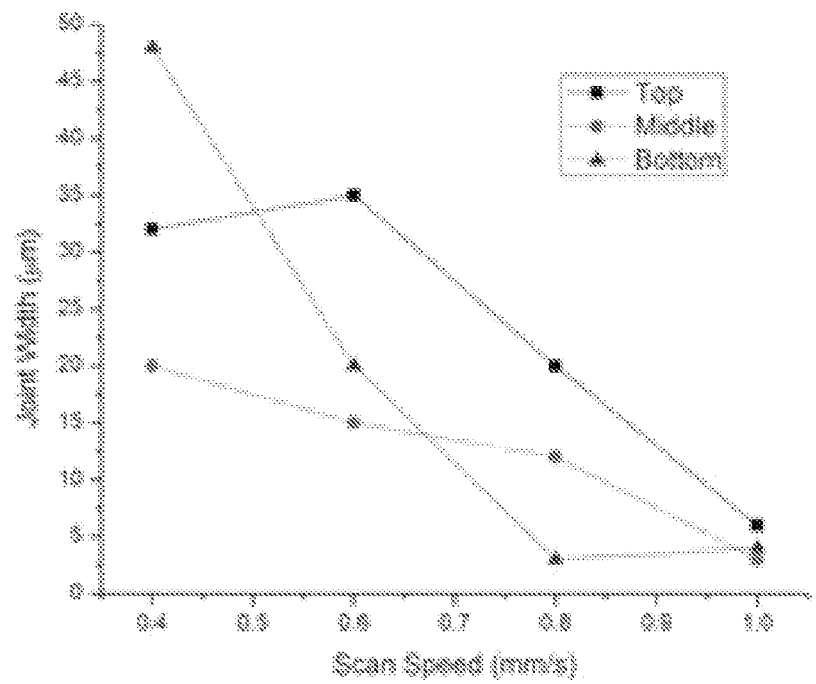
FIG. 17 shows joint width vs. scan speed for samples processed on the stainless steel side of the joint at constant laser power.

FIG. 17 shows the width of the joints at three locations on the joint cross-section as a function of scan speed as determined through EDS line profiles. The joint width can be seen to decrease as a function of scan speed, which is consistent with what was observed for the NiTi-irradiated samples. This is also thought to be due to the decrease in energy put into the wires by the faster laser scan at constant power. At the high end of the scan speed, the joint widths at the top, middle, and bottom of the wire are nearly equal, ranging between 3 and 7 μm. The composition profiles for each of these line scans do not show any appreciable mixed zone between the base materials as was shown in FIG. 7(c). Thus this joint is expected to be formed primarily though wetting of the SS by the NiTi and some amount of diffusion between the two materials at high temperature. For samples processed at lower speeds with larger joint widths, mixed zones are clearly observed (not shown).

FIG. 17 also shows that the joint width is significantly smaller than the beam spot size for all processing conditions. During processing the laser beam is de-focused such that the spot size on the sample surface is roughly 400 μm. The largest joint width in FIG. 9 is 48 μm while the smallest is only 3 μm. Thus the mechanism of joint formation is not direct melting by the laser beam but thermal accumulation as desired.

In embodiments, the where the joint width is significantly smaller than the laser beam spot size, the size of the melt pool or the period during which it is permitted to persist are selected by adjusting scan interval, scan speed, laser intensity, and other factors, to prevent excessive mixing and dilution of the base materials. For example, if the laser scan is performed too slowly, the interface will experience significant pre-heating long before the laser is able to reach the interface and melt the material which will result in unnecessary diffusion between the materials. Due to the axial force exerted on the wires, extended periods at elevated temperatures may also lead to deformation of the base materials and reduction of the contact resistance at the dissimilar metal interface even in the solid state. This may limit the amount of thermal accumulation possible at the interface and may result in incomplete joining.

Composition of the fracture surfaces of a joint created using the autogenous laser brazing process were examined and analyzed. Maps for each element were combined into a RGB color scheme where the intensity of each color represented the signal intensity captured by the EDS for each pixel, with a red, green, and blue stand for Fe, Ni, and Ti, respectively. Most of the fracture surface, on both the NiTi and SS sides of the joint, were found to be dominated by green and blue which indicated that fracture occurred in Ni and Ti-rich regions of the joint. Quantitative compositional analysis of these regions show that, they have a composition of 34.45 at % Ni, 49.46 at % Ti, 12.86 at % Fe, and 3.23 at % Cr on the NiTi fracture surface and 30.43 at % Ni, 44.20 at % Ti, 19.21 at % Fe, and 6.17 at % Cr on the SS fracture surface. Since these compositions are not the same as either base material it can be concluded that fracture is occurring in the joint itself rather than within one of the base materials.

Figure 18:
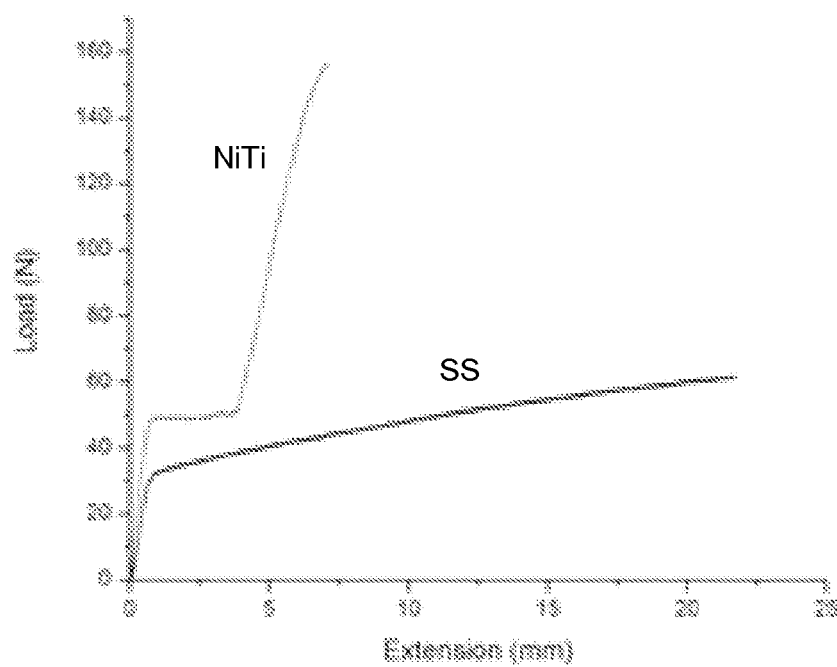
FIG. 18 shows load-displacement curves for base materials NiTi and Stainless Steel. Note load plateau in NiTi curve indicating phase transformation accommodated deformation (i.e. superelasticity).

An ideal joint between dissimilar materials will have a strength that exceeds the weaker of the base materials. FIG. 18 shows load-displacement curves for the NiTi and Stainless Steel wires in the as-received condition. The stainless steel wire yields at an applied load of roughly 30N and fractures at a load of nearly 60N after significant plastic deformation. The NiTi sample initially deforms elastically until the phase transformation from austenite to martensite occurs at about 50N of applied load. A load plateau is observed at this point as the deformation of the material is accommodated though the phase transformation. After the load plateau another linear elastic region is observed and fracture is observed at nearly 160N of applied load. This load-displacement profile is indicative of the superelastic effect. In embodiments of the disclosed methods, in a joint between these two materials, the NiTi composition may be adjusted such that the phase transformation occurred before any plastic deformation would be observed in the stainless steel. In the particular NiTi-SS pair used in this study, the stainless steel will fracture before the NiTi is able to undergo a phase transformation.

Each of the composition maps created were be further analyzed to determine the uniformity of the fracture surface composition and showed the percentage of the fracture surface area that is dominated by Ni and Ti (<33 at % Fe) along with the joint strength as a function of scan speed. The strength of the joints showed the same qualitative trend as the area fraction values on both sides of the joint with samples showing higher area fractions of Ni and Ti-rich fracture surfaces having higher strengths. Samples that show the same area fractions, however, do not exhibit the same level of tensile strength suggesting that while it has a strong effect the area fraction is not the only determinant of joint strength.

Since the majority of melting will be confined to the NiTi-side of the joint due to its lower melting temperature, any major changes in phase and/or composition are expected to occur toward the NiTi side of the joint. If appreciable amounts of Fe are observed on the fracture surface, a few effects can be considered. First, that there was sufficient mixing of the stainless steel into the NiTi in the solid or liquid phase to increase the atomic fraction in the mixed zone; second, that the joint was strong enough that fracture occurred toward the stainless-steel side of the joint during tensile testing; or, thirdly, for large atomic fractions of Fe on the SS-fracture surface, that there was insufficient melting of the NiTi and that joining was not completed over the entire faying surface.

Figure 19:
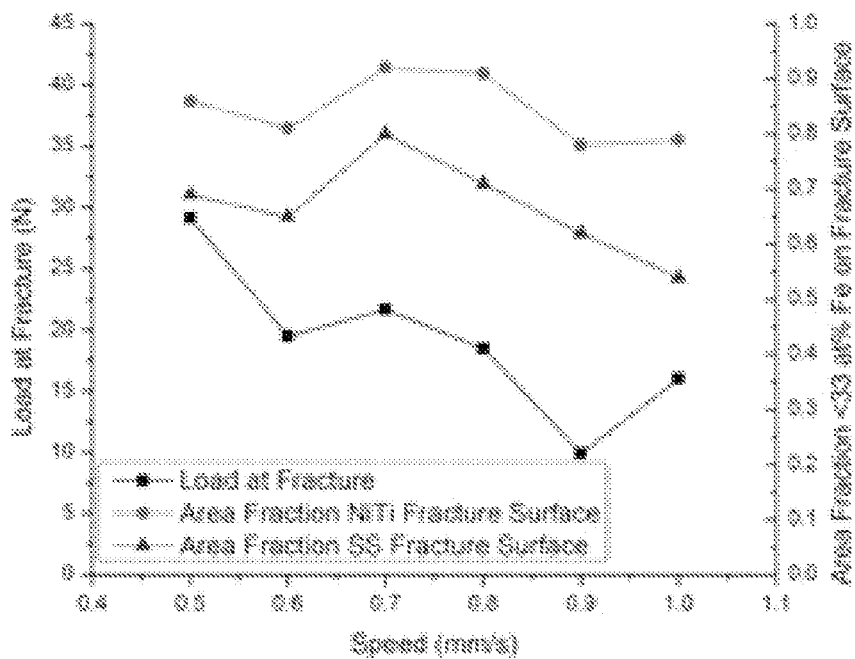
FIG. 19 shows load at fracture and area fraction of fracture surfaces with <33 at % Fe for samples processed on NiTi-side of a joint.

FIG. 19 shows a downward trend in the strength with increasing scan speed. As the laser scan speed is increased the overall energy input into the wire is reduced. As discussed above, this can have the effect of decreasing the melt layer thickness or eliminating the melt layer altogether. As the scan speed increases the area fraction that is NiTi-dominated remains high on the NiTi fracture surface but decreases on the SS fracture surface. A decrease in NiTi-dominated regions suggest that some areas experienced incomplete joining. As scan speed is increased, the uniformity of temperature at the interface is reduced which may result in insufficient melting to cover the entire faying surfaces resulting in decreased strength.

Figure 20:
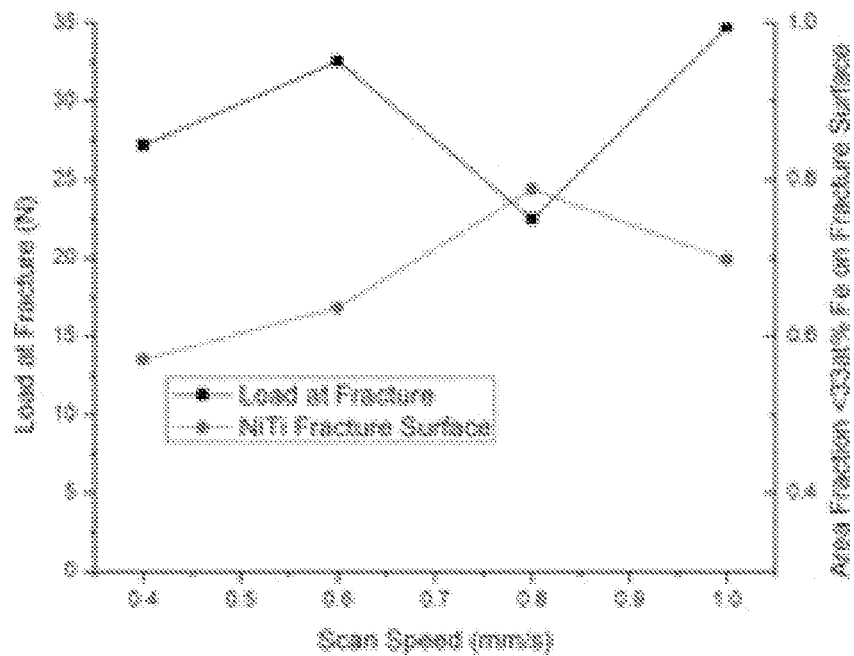
FIG. 20 shows the load at fracture achieved during tensile testing of samples irradiated on the stainless steel side of the joint as a function of scanning speed along with the area fraction of the NiTi fracture surface with <33at % Fe.

FIG. 20 shows the load at fracture achieved during tensile testing of samples irradiated on the stainless steel side of the joint as a function of scanning speed along with the area fraction of the NiTi fracture surface with <33at % Fe. A higher area fraction suggests that there is less dilution of Fe into the NiTi. The two curves in FIG. 20 show opposite qualitative trends with the load at fracture being lower for higher area fractions. In addition, unlike the NiTi irradiated samples shown in FIG. 20, the strength is highest for the highest scan speed. Since the strength is seen to decrease for higher area fractions with significant Fe on the NiTi side, the decrease in strength is likely due to melting of the stainless steel during processing. Melting may controlled to ensure that minimal melting occurs, for example on the SS-wire surface, thereby causing enhanced dilution of the materials. By minimizing the mixing that occurs at the interface between the two molten base materials, brittle intermetallic phase formation may be minimized thereby permitting higher strength of the joints.

Figure 21:
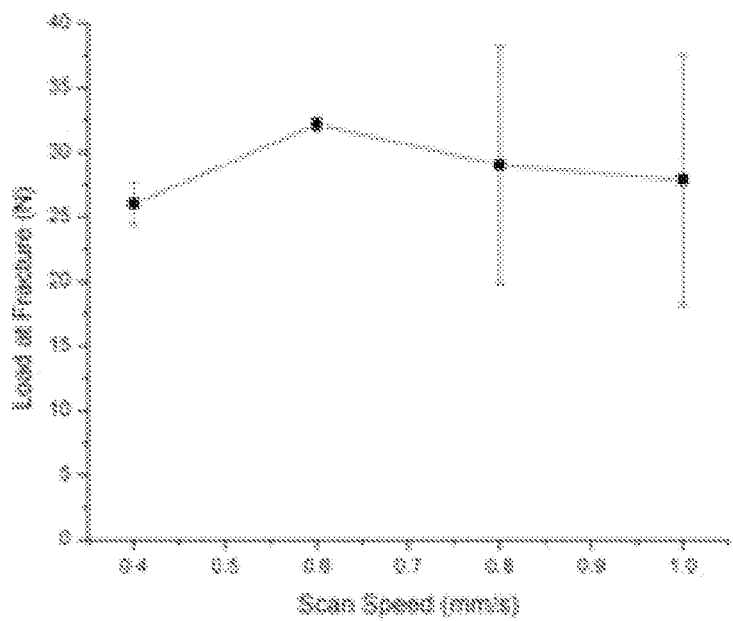
FIG. 21 shows load at fracture with standard deviation for samples processed on SS-side.

FIG. 21 shows the average strength for samples irradiated on the stainless steel side as a function of scan speed along with the standard deviation. While the number of data points for these particular parameters is limited, it was observed that, in general, the joints produced at higher speeds have higher maximum loads at fracture but greater variability while the joints produced at slower speeds are not as strong but more consistent. This variability in joint strength for higher scan speeds suggests that the amount heat accumulation and melting is highly sensitive to joint parameters when limited thermal energy is input into the system. The thermal contact between the two faying surfaces of the joint is considered to be one of the main controlling variables in this case. While the two wires are fixtured and ground flat to provide consistent mating surfaces, the perpendicularity of the face to the axis of the wire cannot be precisely maintained. This causes the two faces to be misaligned which significantly alters the thermal contact resistance across the dissimilar metal interface before processing, a critical parameter for achieving a consistent and thin melt layer at the interface. At the lower scan speeds, even when there is good contact across the interface, the laser is inputting enough energy into the wire to form a melt layer. If the contact is not good, the slow laser scan overheats the wire causing a thicker melt layer to form. At higher scan speeds, good thermal contact results in no melt layer at all while lower thermal conductance leads to very thin melt layers which is may be an ideal melt geometry. Thus, control over the geometry and alignment is required to create dissimilar joints with strengths greater, than the base materials.

The load-displacement curves for the two base materials shown in FIG. 18, along with electron micrographs of the associated fracture surfaces (not shown), confirmed that the base materials fail through ductile fracture. While some of the joints produced using the new autogenous laser joining process have reached strengths close to the yield strength of the stainless steel, no significant ductility has been observed during tensile testing. Inspection of typical fracture surface through electron microscopy for a sample joined using the autogenous laser joining process shows a morphology indicative of quasi-cleavage fracture. As discussed above, fracture is believed to be occurring within the joint, not in the base material. While some plastic deformation is believe to be occurring at the joint, the overall fracture mechanism is still primarily brittle.

A new joining process, laser autogenous brazing, has been investigated for creating seamless joints between two biocompatible materials, NiTi and Stainless Steel 316L for medical device applications. The joints show strengths which approach the yield stress of the stainless steel base material during tensile testing and have fracture surfaces indicative of quasi-cleavage fracture. EDS mapping of the cross-sections indicated that joint widths were significantly smaller than the incident laser beam diameter while fracture surface maps suggested that joint strength is closely tied to compositional uniformity and complete joining of the observed, the joint strengths achieved suggest that laser autogenous brazing is a viable and promising method for creating robust joints between the NiTi and Stainless Steel biocompatible dissimilar material pair.

Referring now to FIGS. 22A through 22E, approximations of the temperature distribution inside first and second members during a autogenous brazing cycle are illustrated at different times proceeding from FIG. 22A to FIG. 22E. The maximum temperature zone is indicated by hatching with the temperature falling progressively with each adjacent zone to the most remote. The position of the laser spot is also illustrated at each point in time. In the last figure (FIG. 22E), the laser has been turned off. As the illustration shows, the brazing process produces a temperature at the interface that is approximately uniform across the interface even though the heating is applied to the side. Also, the hottest region is not broadly distributed within the heated member but is narrowly confined to the interfacial region.

Figure 23:
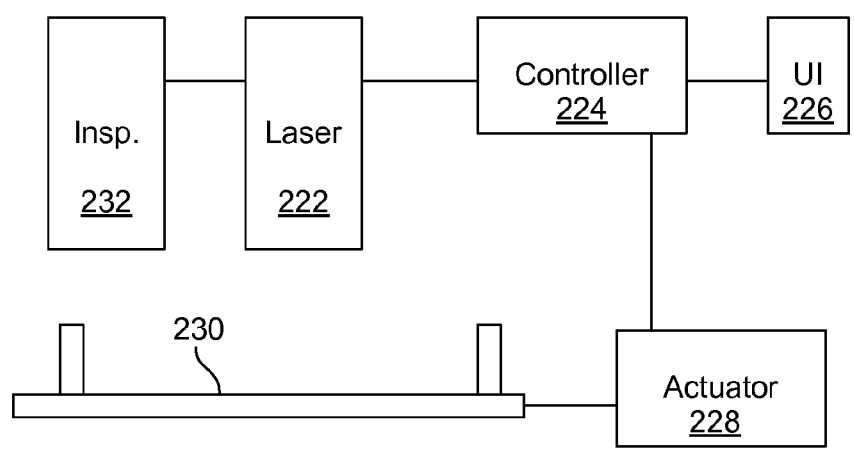
FIG. 23 shows a system for performing autogenous brazing according to an embodiment of the disclosure.
Figure 22A:
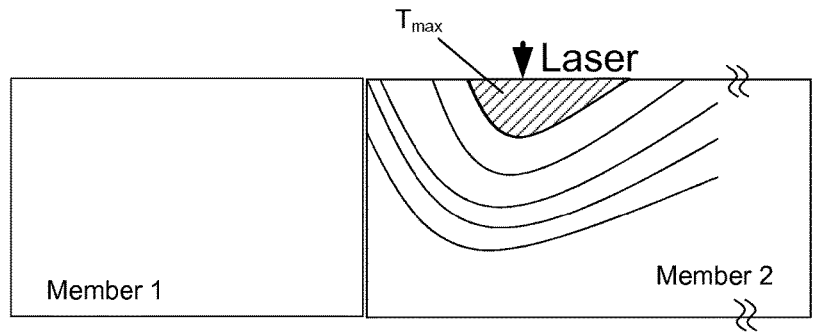
FIG. 22A through 22E illustrate temperature profiles at respective points of scanning of a laser, the profiles existing within the heated member by an autogenous brazing technique to show the effect of thermal accumulation.
Figure 22B:
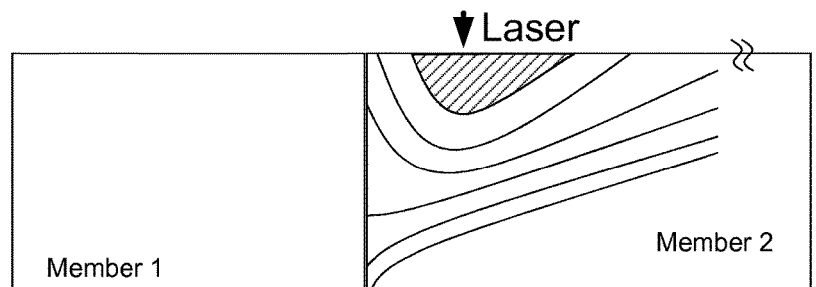
Figure 22C:
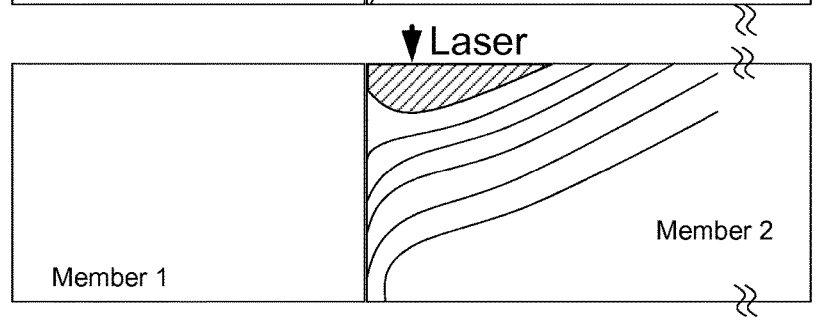
Figure 22D:
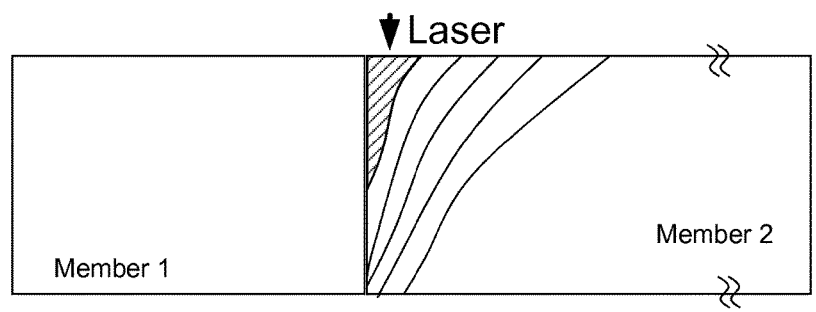
Figure 22E:
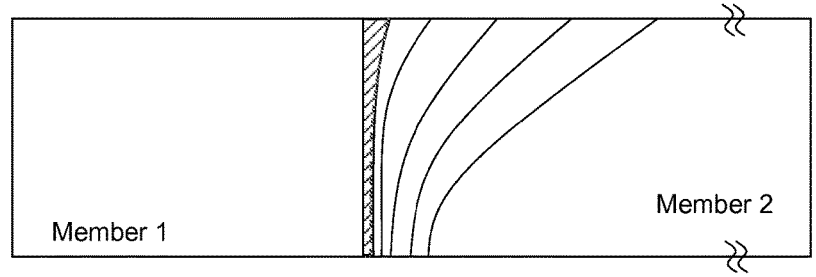

A system for performing autogenous brazing is illustrated in FIG. 23. A controller 224 is programmed through a user interface 226 to control a laser 222 and an actuator 228 which articulates a holding fixture 230 that positions workpieces. The actuator 228 determines the configuration of the holding fixture 230 to permit specified forces and positions to be ensured. A separate inspection device 232 may also be provided to interrogate the configuration of workpieces and allow the holding fixture 230 configuration to be modified by the actuator 228 under control of the controller 224 which may receive inspection data from the inspection device 232. For example, the inspection device may include a laser scanner or multiple cameras for forming a three-dimensional model of the workpieces. The controller 224 may be programmed to ensure proper alignment of workpieces thereby. The laser 222 may be controlled by a program to scan the surface of one or more of the workpieces to form an autogenous brazing joint. The controller 224 need not have any flexibility in that it may be configured simply to drive the laser through a predefined routine, for example, if the workpieces are elements of a routine manufacturing line. The holding fixture may also be belt element for such a line.

To optimize the brazing process for given materials, material geometries, and performance characteristics, the following parameters may be adjusted: material composition, the path over which the heat source (laser) is scanned, the rate of displacement of the laser, the intensity of the heat source (laser), the point or time at which the heat source is terminated, the surface finish of the adjacent surfaces to be brazed, and the force with which the parts to be brazed or pressed together. The intensity of heating may vary rather than stay fixed during a scan and may also be pulsed. Scans can be sequential or continuous. Different parts of a workpiece can be brazed at different times. Other variations are also possible and enabled by the present disclosure.

Although a laser heating source was used for demonstrating the concept, it would be clear to those of skill in the art that other types of heat sources may also be used such as induction heaters or contact heaters. In embodiments, the spot where heat is applied is no larger than the thickness of the material being bonded. In embodiments, the spot where heating is applied is smaller than the thickness of the material (e.g., the diameter if wires are brazed). Although the embodiments and experimental examples employed interfacial planar surface substantially normal to the wire members being joined, the surfaces may also have other shapes and orientations.

Although embodiments were described in which a single laser spot (or generically, a heating device) was scanned, variations of the disclosed subject matter include methods and systems in which multiple heating devices are scanned simultaneously or at different times. In addition although in embodiments, a single member was scanned, variations of the embodiments may be readily devised where two members are simultaneously or sequentially scanned. This may have the effect that one member at any one time is always unheated or heated to a lower temperature. Different types of heating devices and systems may also be combined in a single method or system.

Having now described embodiments of the disclosed subject matter, it should be apparent to those skilled in the art that the foregoing is merely illustrative and not limiting, having been presented by way of example only. Numerous modifications and other embodiments (e.g., combinations, rearrangements, etc.) are within the scope of one of ordinary skill in the art and are contemplated as falling within the scope of the disclosed subject matter and any equivalents thereto. It can be appreciated that variations to the disclosed subject matter would be readily apparent to those skilled in the art, and the disclosed subject matter is intended to include those alternatives. Further, since numerous modifications will readily occur to those skilled in the art, it is not desired to limit the disclosed subject matter to the exact construction and operation illustrated and described, and accordingly, all suitable modifications and equivalents may be resorted to, falling within the scope of the disclosed subject matter.

What is claimed is:

1. A method for joining members of different material composition, comprising:
   providing a first member and a second member having respective surfaces to be joined, the first and second members being of different materials; and
   positioning the first and second member surfaces in close proximity to form a joint interface; and
   applying energy to a moving spot on the first member along a path beginning from a point on the first member remote from the interface to a point proximate to the interface such that a thermal accumulation is generated at the first member surface thereby joining the first and second members.

2. The method of claim 1, wherein the first and second members are wires and the first and second member surfaces are respective longitudinal ends, respectively, thereof.

3. The method of claim 1, wherein the first and second members are sheets and the surfaces are edges of the sheets such that the interface forms a sheet-sheet butt joint.

4. The method of claim 1, wherein the intensity of the applying energy is such that said joining is accomplished without formation of intermetallics at the joint.

5. The method of claim 1, wherein the applying energy includes shining a progressively moving laser spot on the first member, which spot is smaller than the thickness of the first member.

6. The method of claim 1, wherein the first and second members are of steel and nickel-titanium alloy and wherein the NiTi composition is adjusted such that the austenite to martensite phase transformation occurs at a lower mechanical load than plastic deformation in the steel.

7. The method of claim 1, further comprising rapidly cooling said first and second members.

8. The method of claim 1, wherein the first and second member materials are metals selected such that in said applying, the formation of intermetallics is limited to a region whose thickness is less than the thickness of the first and second members at the interface, the thickness being normal to a normal of the member surfaces.

9. A method for joining two dissimilar metals, comprising:
   restrictively melting one of the dissimilar metals without melting the other dissimilar metal; and
   solidifying on the other dissimilar metal the one dissimilar metal to form a joint, wherein
   said joining is performed without any of a filler material, an adhesive, or a mechanical fastener, and
   the restrictive melting is performed by scanning a laser beam along the one dissimilar metal toward the interface of the dissimilar metals.

10. The method of claim 9, wherein the first and second metals have different melting temperatures.

11. The system of claim 9, wherein the first and second metals have substantially the same melting temperature.

12. The method of claim 9, further comprising controlling one or more of the laser beam's power, scan velocity, beam shape, and beam size such that an equilibrium temperature of the other dissimilar metal is below its melting point.

13. The method of claim 9, further comprising:
   shutting off the laser beam once the one metal is molten, thereby ensuring that melting of the other metal does not occur.

14. A method for joining members of different material composition, comprising:
   providing a first member and a second member having respective surfaces to be joined, the first and second members being of different materials; and
   positioning the first and second member surfaces in close proximity to form a generally planar joint interface; and
   scanning a laser as a moving spot to the first member along a path beginning from a point on the first member remote from the interface to a point proximate to the interface such that a thermal accumulation is generated at the first member surface thereby joining the first and second members, the scanning being performed at a rate of between 0.1 and 10 m/s along a line normal to a plane of the joint interface.

15. The method of claim 14, wherein the intensity of the scanning is such that said joining is accomplished without formation of intermetallics at the joint.

16. The method of claim 14, wherein the scanning includes scanning from a point remote from the joint interface to a point up to, or short of, the joint interface and terminating the laser at said point.

17. The method of claim 14, wherein the scanning includes scanning from a point remote from the joint interface to a point that is short of the joint interface and terminating the laser at said point.

18. The method of claim 14, wherein the scanning includes shining a progressively moving laser spot on the first member, which spot is smaller than the thickness of the first member.

19. The method of claim 14, wherein the first and second members are of steel and nickel-titanium alloy and wherein the NiTi composition is adjusted such that the austenite to martensite phase transformation occurs at a lower load than plastic deformation in the steel.

20. The method of claim 14, further comprising rapidly cooling said first and second members.

21. The method of claim 14, wherein the first and second member materials are metals selected such that in said applying, the formation of intermetallics is limited to a region whose thickness is less than the thickness of the first and second members at the interface, the thickness being normal to a normal of the member surfaces.

* * * * *